(12) United States Patent
Allavatam et al.

(10) Patent No.: US 12,508,426 B2
(45) Date of Patent: Dec. 30, 2025

(54) METHOD AND APPARATUS FOR OPTIMIZING NEURAL SENSING

(71) Applicant: Boston Scientific Neuromodulation Corporation, Valencia, CA (US)

(72) Inventors: Venugopal Allavatam, Saratoga, CA (US); Tianhe Zhang, Studio City, CA (US); Rosana Esteller, Santa Clarita, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 427 days.

(21) Appl. No.: 18/098,311

(22) Filed: Jan. 18, 2023

(65) Prior Publication Data

US 2023/0241398 A1 Aug. 3, 2023

Related U.S. Application Data

(60) Provisional application No. 63/305,479, filed on Feb. 1, 2022.

(51) Int. Cl.
*A61N 1/36* (2006.01)
*A61N 1/372* (2006.01)

(52) U.S. Cl.
CPC ..... *A61N 1/36139* (2013.01); *A61N 1/37235* (2013.01)

(58) Field of Classification Search
CPC ............ A61N 1/36139; A61N 1/37241; A61N 1/36062; A61N 1/36071; A61N 1/36142; A61N 1/36185; A61B 5/388; A61B 5/407
See application file for complete search history.

(56) References Cited

U.S. PATENT DOCUMENTS 10,130,813 B2 11/2018 Crowder et al.
2019/0099602 A1* 4/2019 Esteller .............. A61N 1/37241
(Continued)

FOREIGN PATENT DOCUMENTS

WO WO-2021007615 A1 1/2021
WO WO-2023150020 A1 8/2023

OTHER PUBLICATIONS

"European Application Serial No. 23706470.4, Response to Communication Pursuant to Rules 161 and 162 EPC filed Feb. 20, 2025", 11 pgs.
(Continued)

*Primary Examiner* — Paula J Stice
(74) *Attorney, Agent, or Firm* — Schwegman Lundberg & Woessner, P.A.

(57) ABSTRACT

An example of a system for delivering neurostimulation and sensing one or more signals may include a programming control circuit and a parameter control circuit. The programming control circuit may be configured to control the delivery of the neurostimulation according to stimulation parameters and the sensing of a target neural signal including target neural responses according to sensing parameters. The parameter control circuit may be configured to determine the stimulation parameters and the sensing parameters and may include a recording analyzer. The recording analyzer may be configured to evaluate a sequence of test recording configurations each including a set of recording configuration parameters selected from the stimulation parameters and the sensing parameters and to determine one or more recording configurations suitable for detection of the target neural responses using an outcome of the evaluation.

20 Claims, 10 Drawing Sheets

(56) References Cited

U.S. PATENT DOCUMENTS

| | | | |
|---|---|---|---|
| 2020/0368518 A1* | 11/2020 | Vera-Portocarrero | ..................... G16H 40/63 |
| 2021/0031043 A1 | 2/2021 | Esteller et al. | |
| 2021/0046322 A1 | 2/2021 | Zhang et al. | |
| 2021/0187297 A1* | 6/2021 | Pulliam | .............. A61N 1/36062 |
| 2021/0187299 A1* | 6/2021 | Dinsmoor | .............. A61N 1/025 |
| 2021/0236829 A1 | 8/2021 | Zhang et al. | |
| 2021/0387003 A1* | 12/2021 | Kelly | ................. A61N 1/36139 |

OTHER PUBLICATIONS

"International Application Serial No. PCT/US2023/011000, International Preliminary Report on Patentability mailed Aug. 15, 2024", 8 pgs.

"International Application Serial No. PCT/US2023/011000, International Search Report mailed May 15, 2023", 4 pgs.

"International Application Serial No. PCT/US2023/011000, Written Opinion mailed May 15, 2023", 6 pgs.

* cited by examiner

METHOD AND APPARATUS FOR OPTIMIZING NEURAL SENSING

CLAIM OF PRIORITY

This application claims the benefit of U.S. Provisional Application No. 63/305,479, filed on Feb. 1, 2022, which is hereby incorporated by reference in its entirety.

TECHNICAL FIELD

This document relates generally to neurostimulation and more particularly to a method and system for determining parameters suitable or optimal for sensing biopotential signals during neurostimulation.

BACKGROUND

Neurostimulation, also referred to as neuromodulation, has been proposed as a therapy for a number of conditions. Examples of neurostimulation include Spinal Cord Stimulation (SCS), Deep Brain Stimulation (DBS), Peripheral Nerve Stimulation (PNS), and Functional Electrical Stimulation (FES). Implantable neurostimulation systems have been applied to deliver such a therapy. An implantable neurostimulation system may include an implantable neurostimulator, also referred to as an implantable pulse generator (IPG), and one or more implantable leads each including one or more electrodes. The implantable neurostimulator delivers neurostimulation energy through one or more electrodes placed on or near a target site in the nervous system. An external programming device is used to program the implantable neurostimulator with stimulation parameters controlling the delivery of the neurostimulation energy.

In one example, the neurostimulation energy is delivered in a form of electrical pulses. The delivery is controlled using stimulation parameters that specify spatial (where to stimulate), temporal (when to stimulate), and informational (patterns of pulses directing the nervous system to respond as desired) aspects of a pattern of the electrical pulses. Various signals may be sensed from a patient and/or an environment of the patient for setting and adjusting the stimulation parameters. For example, a signal indicative of the patient's changing condition may be sensed to start, stop, or adjust the delivery of a neurostimulation therapy, and a signal indicative of the patient's response to a neurostimulation therapy may be sensed to allow for closed-loop control of its delivery. Efficacy and safety of such neurostimulation therapies may depend on proper sensing of signals that is controlled using sensing parameters that specify spatial (where to sense), temporal (when to sense), and informational (signal conditioning and processing) aspects of sensing. Examples of the signals sensed for such neurostimulation therapies include biopotential signals sensed from nerves of the patient to indicate spontaneous and/or evoked neural potentials.

SUMMARY

An Example (e.g., "Example 1") of a system for delivering neurostimulation to a patient and sensing one or more signals from the patient using a stimulation device and a plurality of electrodes coupled to the stimulation device is provided. The system may include a programming control circuit and a parameter control circuit. The programming control circuit may be configured to control the delivery of the neurostimulation according to stimulation parameters and to control the sensing of a target neural signal of the one or more signals according to sensing parameters. The target neural signal includes target neural responses each being a response of a specified type to the delivery of the neurostimulation. The parameter control circuit may be configured to determine the stimulation parameters and the sensing parameters and may include a recording analyzer. The recording analyzer may be configured to evaluate a sequence of test recording configurations each including a set of recording configuration parameters selected from the stimulation parameters and the sensing parameters and to determine one or more suitable recording configurations using an outcome of the evaluation. The one or more suitable recording configurations may each have values of the set of recording configuration parameters allowing for detection of the target neural responses from the sensed target neural signal.

In Example 2, the subject matter of Example 1 may optionally be configured such that the recording analyzer is configured to determine the one or more suitable recording configurations for detection of evoked compound action potentials (ECAPs).

In Example 3, the subject matter of Example 2 may optionally be configured such that the recording analyzer is configured to determine the one or more suitable recording configurations for detection of one or more specified morphological features of the ECAPs.

In Example 4, the subject matter of any one or any combination of Examples 1 to 3 may optionally be configured such that the recording analyzer is configured to determine the one or more suitable recording configurations by determining a signal-to-noise ratio (SNR) of the sensed target neural signal and comparing the determined SNR to a threshold SNR.

In Example 5, the subject matter of any one or any combination of Examples 1 to 4 may optionally be configured such that the recording analyzer is configured to determine the one or more suitable recording configurations by determining a feature magnitude of the sensed target neural signal and comparing the determined feature magnitude to a threshold magnitude.

In Example 6, the subject matter of any one or any combination of Examples 1 to 5 may optionally be configured such that the recording analyzer is configured to determine an optimal recording configuration by evaluating the sequence of test recording configurations. The optimal recording configuration has values of the set of recording configuration parameters optimized for detection of the target neural responses from the sensed target neural signal.

In Example 7, the subject matter of Example 6 may optionally be configured such that the recording analyzer is configured to determine the optimal recording configuration by determining a signal-to-noise ratio (SNR) of the sensed target neural signal resulting from each test recording configuration of the sequence of test recording configurations and selecting the test recording configuration resulting in a maximum SNR to be the optimal recording configuration.

In Example 8, the subject matter of any one or any combination of Examples 6 and 7 may optionally be configured such that the recording analyzer is configured to determine the optimal recording configuration by determining a feature magnitude of the sensed target neural signal resulting from each test recording configuration of the sequence of test recording configurations and selecting the optimal recording configuration from the sequence of test recording configurations based on the feature magnitude determined for the each test recording configuration and an amplitude of stimulation defined by that test recording configuration.

In Example 9, the subject matter of any one or any combination of Examples 1 to 8 may optionally be configured such that the recording analyzer is configured to evaluate values of one or more stimulation parameters defining an intensity of the neurostimulation. The values of the one or more stimulation parameters are swept in the sequence of test recording configurations.

In Example 10, the subject matter of any one or any combination of Examples 1 to 9 may optionally be configured such that the recording analyzer is configured to evaluate values of one or more sensing parameters controlling processing of the neural response signal. The values of the one or more sensing parameters are swept in the sequence of test recording configurations.

In Example 11, the subject matter of any one or any combination of Examples 1 to 10 may optionally be configured such that the recording analyzer is configured to dynamically adjust the sequence of test recording configurations during the evaluation of the sequence of test recording configurations based on results that have become available during the evaluation of the sequence of test recording configurations.

In Example 12, the subject matter of any one or any combination of Examples 1 to 11 may optionally be configured to further include a programming device configured to be communicatively coupled to the stimulation device. The programming device includes the programming control circuit, a storage device, and a user interface including a display screen, a user input device, and an interface control circuit including the parameter control circuit.

In Example 13, the subject matter of Example 12 may optionally be configured such that the recording analyzer is configured to control generation of the stimulation parameters and the sensing parameters according to the sequence of test recording configurations, to control data collection during the delivery of the neurostimulation according to the sequence of test recording configurations, and to determine the one or more suitable recording configurations by automatically analyzing the collected data.

In Example 14, the subject matter of Example 12 may optionally be configured such that the recording analyzer is configured to control generation of the stimulation parameters and the sensing parameters according to the sequence of test recording configurations, to control data collection during the delivery of the neurostimulation according to the sequence of test recording configurations, and to guide the determination of the one or more suitable recording configurations using the user interface.

In Example 15, the subject matter of any one or any combination of Examples 12 to 14 may optionally be configured such that the programming device is configured to program the stimulation device for controlling the delivery of the neurostimulation using the sensed target neural signal, and the parameter control circuit is configured to determine at least one of a neural threshold (NT) or morphological features of the target neural responses. The NT is for recording the target neural signal and is a minimum intensity of the neurostimulation for which target neural responses are detectable. The morphological features of the target neural responses allow for a closed-loop control of the delivery of the neurostimulation.

An example (e.g., "Example 16") of a method for delivering neurostimulation to a patient and sensing one or more signals from the patient using a stimulation device and a plurality of electrodes coupled to the stimulation device is also provided. The method may include controlling the delivery of the neurostimulation according to stimulation parameters, controlling the sensing of a target neural signal of the one or more signals according to sensing parameters, and determining the stimulation parameters and the sensing parameters using a processor. The target neural signal includes target neural responses each being a response of a specified type to the delivery of the neurostimulation. The determination of the stimulation parameters and the sensing parameters may include evaluating a sequence of test recording configurations each including a set of recording configuration parameters selected from the stimulation parameters and the sensing parameters and determining one or more suitable recording configurations using an outcome of the evaluation. The one or more suitable recording configurations may each have values of the set of recording configuration parameters allowing for detection of the target neural responses from the sensed target neural signal.

In Example 17, the subject matter of determining the one or more suitable recording configurations as found in Example 16 may optionally include determining an optimal recording configuration having values of the set of recording configuration parameters optimized for automatic detection of the target neural responses from the sensed target neural signal.

In Example 18, the subject matter of controlling the sensing of the target neural signal as found in any one or any combination of Examples 16 and 17 may optionally include controlling the sensing of a neural signal including evoked compound action potentials (ECAPs), and the subject matter of determining the one or more suitable recording configurations as found in any one or any combination of Examples 16 and 17 may optionally include determining the one or more suitable recording configurations for automatic detection of one or more specified morphological features of the ECAPs.

In Example 19, the subject matter of any one or any combination of Examples 16 to 18 may optionally further include determining the sequence of test recording configurations prior to the evaluation of the sequence of test recording configurations. The determination of the sequence of test recording configurations includes determining an order of the test recording configurations in the sequence of test recording configurations and determining timing windows for analyzing the sensed target neural signal relative to the delivery of the neurostimulation.

In Example 20, the subject matter of evaluating the sequence of test recording configurations as found in Example 19 may optionally include collecting data representing the sensed target neural signal, dividing the collected data into snippets using a window corresponding to a stimulation epoch associated with each stimulus of the neurostimulation and excluding artifact resulting from that stimulus, and determining one or more specified morphological features of the target neural responses using the collected data in the snippets.

In Example 21, the subject matter of any one or any combination of Examples 19 and 20 may optionally further include dynamically adjusting the sequence of test recording configurations during the evaluation of the sequence of test recording configurations while the neurostimulation is being delivered according to the sequence of test recording configurations based on results that have become available during the evaluation of the sequence of test recording configurations.

In Example 22, the subject matter of dynamically adjusting the sequence of test recording configurations as found in Example 21 may optionally include adding test recording configurations defining one or more additional stimulation sites in response to the target neural responses not being detectable as indicated by the results that have become available during the evaluation of the sequence of test recording configurations.

In Example 23, the subject matter of determining the one or more suitable recording configurations using the outcome of the evaluation as found in any one or any combination of Examples 16 to 21 may optionally further include presenting the outcome of the evaluation using a user interface and receiving a selection of the one or more suitable recording configurations using the user interface.

In Example 24, the subject matter of claim 23 may optionally further include detecting morphological features from the sensed target neural signal and measuring one or more neural response parameters from the detected morphological features, and the subject matter of presenting the outcome of the evaluation as found in claim 23 may optionally include presenting at least one of the detected morphological features or the measured one or more neural response parameters.

An example (e.g., "Example 25") of a non-transitory computer-readable storage medium including instructions, which when executed by a system, cause the system to perform a method for delivering neurostimulation to a patient and sensing one or more signals from the patient using a stimulation device and a plurality of electrodes coupled to the stimulation device is also provided. The method may include controlling the delivery of the neurostimulation according to stimulation parameters, controlling the sensing of a target neural signal of the one or more signals according to sensing parameters, and determining the stimulation parameters and the sensing parameters using a processor. The target neural signal includes target neural responses each being a response of a specified type to the delivery of the neurostimulation. The determination of the stimulation parameters and the sensing parameters may include evaluating a sequence of test recording configurations each including a set of recording configuration parameters selected from the stimulation parameters and the sensing parameters and determining one or more suitable recording configurations using an outcome of the evaluation. The one or more suitable recording configurations may each have values of the set of recording configuration parameters allowing for detection of the target neural responses from the sensed target neural signal.

This Summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

The drawings illustrate generally, by way of example, various embodiments discussed in the present document. The drawings are for illustrative purposes only and may not be to scale.

DETAILED DESCRIPTION

Figure 1:
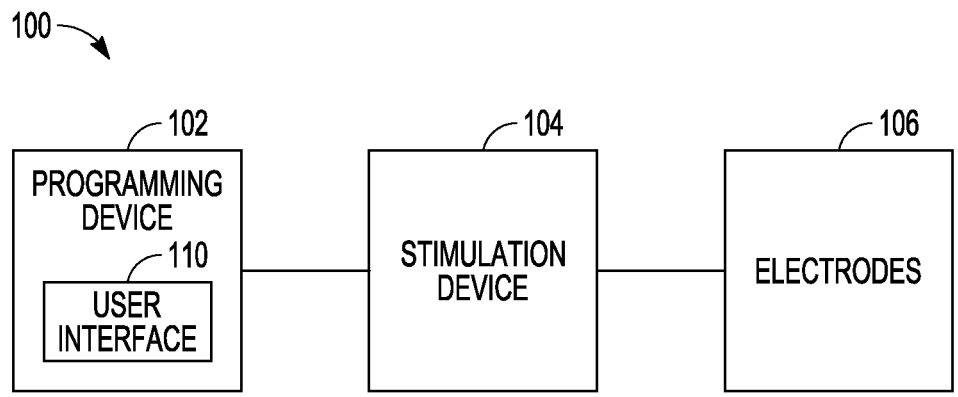
FIG. 1 illustrates an embodiment of a neurostimulation system.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized, and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

This document discusses, among other things, a method and system for determining parameters for sensing neural signals of a specified type in a neurostimulation system. In various embodiments, the neuromodulation system can include an implantable device configured to deliver neurostimulation (also referred to as neuromodulation) therapies, such as deep brain stimulation (DBS), spinal cord stimulation (SCS), peripheral nerve stimulation (PNS), and vagus nerve stimulation (VNS), and one or more external devices configured to program or adjust the implantable device for its operations and monitor the performance of the implantable device. Various operations of the implantable device, including sensing and stimulation, can be controlled using such one or more external devices. In this document, unless noted otherwise, a "patient" includes a person receiving treatment delivered from, and/or monitored using, a neurostimulation system according to the present subject matter. A "user" includes a physician, other caregiver who examines and/or treats the patient using the neurostimulation system, or other person who participates in the examination and/or treatment of the patient using the neurostimulation system (e.g., a technically trained representative, a field clinical engineer, a clinical researcher, or a field specialist from the manufacturer of the neurostimulation system).

The neurostimulation system may sense neural signals including spontaneous activity and/or evoked potentials and may depend on proper sensing for verifying lead and electrode placement, setting stimulation parameters that control delivery of neurostimulation pulses for a therapy, and adjusting the stimulation parameters in responses to changing needs and/or conditions of a patient, among other things. Types of neural potentials to be sensed may depend on the type of therapy. For example, in the pain control therapy using SCS, evoked compound action potentials (ECAPs) are sensed from the patient to indicate response of the patient's dorsal columns (axons) to the neurostimulation. The response may include paresthesia as the sensation of stimulation is transmitted to the patient's brain. When this response (as indicated by the ECAPs) increases, the intensity of the paresthesia also increases. When this response decreases, the intensity of the paresthesia also decreases. Therefore, the ECAPs can be used to indicate the intensity of the paresthesia, which is used in various procedures of determining settings of the neurostimulation system for effective pain suppression suitable for the patient and adjusting the settings when conditions and/or needs of the patient change. However, finding ECAPs after the implantable device is placed in the patient can be a challenge. It may take an experienced user a long time (e.g., about 45 minutes) to manually determine a set of stimulation and sensing parameters that provide for reliable sensing of ECAPs.

The present subject matter provides for determination of the set of stimulation and sensing parameters for sensing specified type of neural signals such as evoked potentials (EPs) including ECAPs. In various embodiments, the set of stimulations and sensing parameters are optimized for sensing the specified type of neural signals. While sensing of ECAPs is discussed specifically in this document as an example, the present subject matter can be applied for sensing of various types of neural signals. Examples of such neural signals recorded from the spinal cord include ECAPs, dorsal root potentials (DRPs), and cord dorsum potentials (CDPs). Some other examples of such neural signals that can be recorded from the spinal cord and/or the brain include local field potentials (LFPs), local evoked potentials such as DBS local evoked potentials (DLEPs) or evoked resonant neural activity (ERNA), evoked oscillations, and spontaneous oscillations such as those recorded by electroencephalography (EEG).

In various embodiments, the present subject matter can be applied to reduce the time for programming the implantable device for a patient by guiding various parameter selection and learning processes. An automated EP, ERNA, or ECAP search algorithm implementing the present subject matter can be executed to record sensing data while applying (e.g., sweeping) a sequence of the set of stimulation and sensing parameters. The recorded sensing data can then be analyzed to determine, for example, sensing parameters (e.g., spatial parameters for sensing channel and/or electrode selection), neural threshold (e.g., minimum stimulation amplitude that results in a minimum amplitude of EP, ERNA, or ECAP that is recordable), and selection of EP, ERNA, or ECAP features for closed-loop control of the neurostimulation.

FIG. 1 illustrates an embodiment of a neurostimulation system 100. System 100 includes electrodes 106, a stimulation device 104, and a programming device 102. Electrodes 106 are configured to be placed on or near one or more neural targets in a patient. Stimulation device 104 is configured to be electrically connected to electrodes 106 and deliver neurostimulation energy, such as in the form of electrical pulses, to the one or more neural targets though electrodes 106. The delivery of the neurostimulation is controlled by using a plurality of stimulation parameters, such as stimulation parameters specifying a pattern of the electrical pulses and a selection of electrodes through which each of the electrical pulses is delivered. In various embodiments, stimulation device 104 senses one or more signals and/or receives one or more sensed signals from sensors, and the delivery of the neurostimulation can also be controlled using the sensed signal(s). In various embodiments, at least some parameters of the plurality of stimulation parameters are programmable by a user, such as a physician or other caregiver who treats the patient using system 100. Programming device 102 provides the user with accessibility to the user-programmable parameters. In various embodiments, programming device 102 is configured to be communicatively coupled to stimulation device via a wired or wireless link. In various embodiments, the patient can be allowed to adjust his or her treatment using system 100 to certain extent, such as by adjusting certain therapy parameters and entering feedback and clinical effect information.

In various embodiments, programming device 102 can include a user interface 110 that allows the user to control the operation of system 100 and monitor the performance of system 100 as well as conditions of the patient including responses to the delivery of the neurostimulation. The user can control the operation of system 100 by setting and/or adjusting values of the user-programmable parameters.

In various embodiments, user interface 110 can include a graphical user interface (GUI) that allows the user to set and/or adjust the values of the user-programmable parameters by creating and/or editing graphical representations of various waveforms. Such waveforms may include, for example, a waveform representing a pattern of neurostimulation pulses to be delivered to the patient as well as individual waveforms that are used as building blocks of the pattern of neurostimulation pulses, such as the waveform of each pulse in the pattern of neurostimulation pulses. The GUI may also allow the user to set and/or adjust stimulation fields each defined by a set of electrodes through which one or more neurostimulation pulses represented by a waveform are delivered to the patient. The stimulation fields may each be further defined by the distribution of the current of each neurostimulation pulse in the waveform. In various embodiments, neurostimulation pulses for a stimulation period (such as the duration of a therapy session) may be delivered to multiple stimulation fields.

In various embodiments, system 100 can be configured for neurostimulation applications. User interface 110 can be configured to allow the user to control the operation of system 100 for neurostimulation. For example, system 100 as well as user interface 110 can be configured for SCS applications. While an SCS system is illustrated and discussed as an example, the present subject matter applies to any neurostimulation system with electrodes placed in locations suitable for sensing one or more neural signals from which indications of degenerative and/or other nerve diseases can be detected and monitored.

Figure 2:
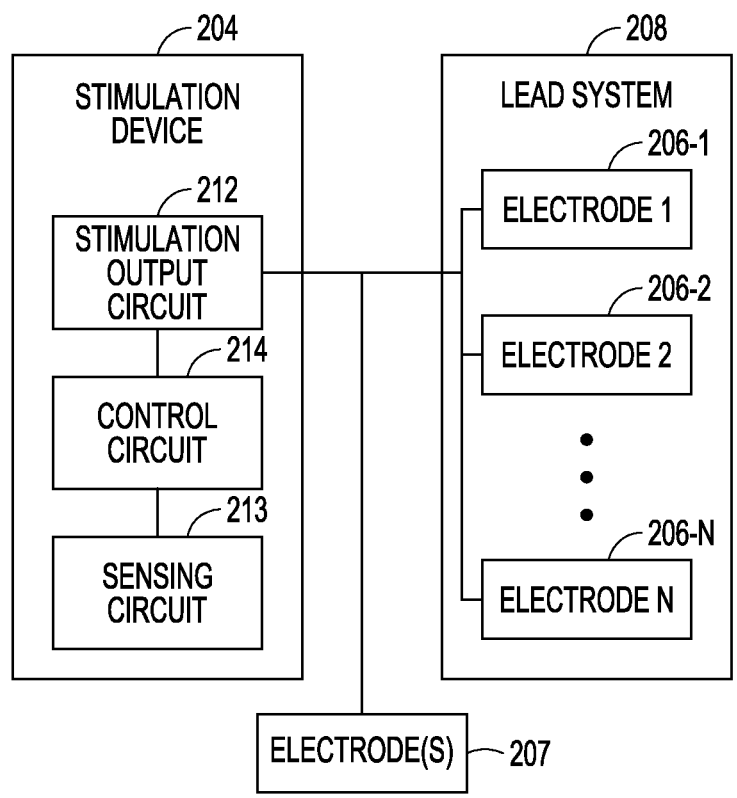
FIG. 2 illustrates an embodiment of a stimulation device and a lead system, such as may be implemented in the neurostimulation system of FIG. 1.

FIG. 2 illustrates an embodiment of a stimulation device 204 and a lead system 208, such as may be implemented in neurostimulation system 100. Stimulation device 204 represents an example of stimulation device 104 and includes a stimulation output circuit 212, a sensing circuit 213, and a control circuit 214. Stimulation output circuit 212 produces and delivers neurostimulation pulses. Sensing circuit 213 senses one or more signals. Control circuit 214 controls the delivery of the neurostimulation pulses from stimulation output circuit 212 and the sensing of the one or more signals. In various embodiment, control circuit 214 controls the delivery of the neurostimulation pulses using the sensed one or more signals.

Lead system 208 includes one or more leads each configured to be electrically connected to stimulation device 204 and a plurality of electrodes 206 distributed in the one or more leads. The plurality of electrodes 206 includes electrode 206-1, electrode 206-2, . . . electrode 206-N, each a single electrically conductive contact providing for an electrical interface between stimulation output circuit 212 and tissue of the patient, where N≥1. The neurostimulation pulses are each delivered from stimulation output circuit 212 through a set of electrodes selected from electrodes 206. In various embodiments, the neurostimulation pulses may include one or more individually defined pulses, and the set of electrodes may be individually definable by the user for each of the individually defined pulses or each of collections of pulse intended to be delivered using the same combination of electrodes. In various embodiments, one or more additional electrodes 207 (each of which may be referred to as a reference electrode) can be electrically connected to stimulation device 204, such as one or more electrodes each being a portion of or otherwise incorporated onto a housing of stimulation device 204. Monopolar stimulation uses a monopolar electrode configuration with one or more electrodes selected from electrodes 206 and at least one electrode from electrode(s) 207. Bipolar stimulation uses a bipolar electrode configuration with two electrodes selected from electrodes 206 and none from electrode(s) 207. Multipolar stimulation uses a multipolar electrode configuration with multiple (two or more) electrodes selected from electrodes 206 and optionally electrode(s) 207.

In various embodiments, the number of leads and the number of electrodes on each lead depend on, for example, the distribution of target(s) of the neurostimulation and the need for controlling the distribution of electric field at each target. In various embodiments, lead system 208 can include 2 leads each having 8 electrodes, 4 leads each having 8 electrodes, 2 leads each having 16 electrodes, or any other number of leads and electrodes needed for delivering neurostimulation to identified target(s). Lead and electrode configurations are illustrated in this document as examples and not limitations. For example, various embodiments can use paddle electrodes, cuff electrodes, and other electrodes suitable for delivering neurostimulation.

Stimulation output circuit 212 can deliver neurostimulation (i.e., the neurostimulation energy, such as in the form of electrical pulses) to the patient through stimulation electrodes selected from a plurality of electrodes including electrodes 206 and 207. Stimulation output circuit 212 can include one or more stimulation channels each configurable (e.g., programmable) for delivering a portion of the neurostimulation to a target location in the patient using a set of stimulation electrodes selected from the plurality of electrodes. Sensing circuit 213 can sense one or more signals from the patient using sensing electrodes selected from the plurality of electrodes including electrodes 206 and 207. The one or more signals can include one or more neural signals indicative of a response of the patient to the delivery of the neurostimulation. Sensing circuit 213 can include one or more sensing channels each configurable (e.g., programmable) for sensing a signal of the one or more signals using a set of sensing electrodes selected from the plurality of electrodes. Control circuit 214 can control the delivery of the neurostimulation according to stimulation parameters and to control the sensing of the one or more signals according to sensing parameters. The stimulation parameters can specify the stimulation channel and, for the stimulation channel, a set of stimulation electrodes selected from the plurality of electrodes and the stimulation waveform. When the neurostimulation is delivery in the form of electrical pulses, stimulation parameters defining the stimulation waveform can include, for example, pulse amplitude, pulse width, pulse frequency, duty cycle, and pulse waveform (charge injection and charge recovery phases, interphase interval, etc.). The sensing parameters can specify the sensing channel and, for the sensing channel, a set of sensing electrodes selected from the plurality of electrodes and parameters controlling signal conditioning and processing, such as such as amplifier (input range, amplifier gain) and filters (DC offset compensation, low-pass and high-pass) settings.

Figure 3:
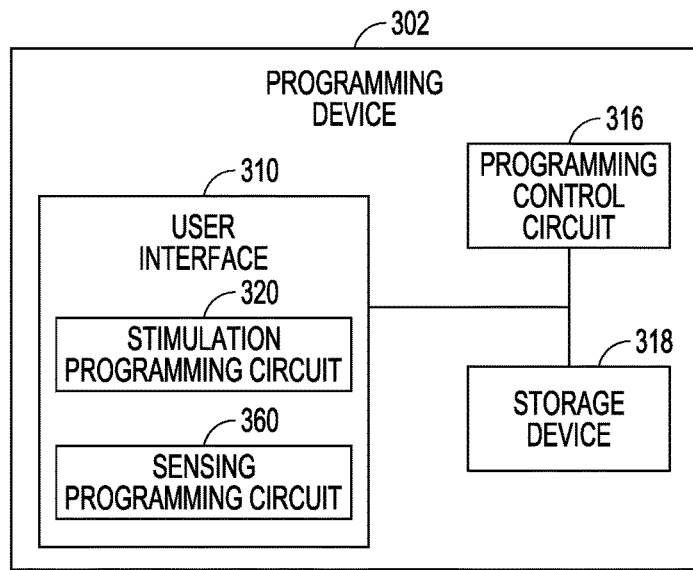
FIG. 3 illustrates an embodiment of a programming device, such as may be implemented in the neurostimulation system of FIG. 1.

FIG. 3 illustrates an embodiment of a programming device 302, such as may be implemented in neurostimulation system 100. Programming device 302 represents an example of programming device 102 and includes a storage device 318, a programming control circuit 316, and a user interface 310. Programming control circuit 316 generates programming information (e.g., programming code to be transmitted to stimulation device 204 for control circuit 214 to operate) to control delivery of neurostimulation (e.g., from stimulation output circuit 212) and sensing of one or more signals (e.g., using sensing circuit 213). The programming information can include data representing stimulation parameters controlling the delivery of the neurostimulation and sensing parameters controlling the sensing of the one or more signals (e.g., the stimulation parameters and the sensing parameters used by control circuit 214). Programming control circuit 316 can generate programming information according to a specified neurostimulation program that can specify, for example, stimulation parameters defining stimulation waveform and stimulation electrode configuration and sensing parameters defining sensing electrode configuration and signal processing. User interface 310 represents an example of user interface 110 and includes a stimulation programming circuit 320 and a sensing programming circuit 360. Storage device 318 stores information used by programming control circuit 316, stimulation programming circuit 320, and sensing programming circuit 360, such as information about a stimulation device that relates the neurostimulation program to the plurality of stimulation parameters. Stimulation programming circuit 320 and sensing programming circuit 360 can be configured to support functions related to stimulation and sensing, respectively, that allow for programming of stimulation devices, such as stimulation device 104 including its various embodiments as discussed in this document, according to one or more selected neurostimulation programs and/or various other algorithms, including the algorithm for determining one or more neural response recording configurations as discussed in this document.

In various embodiments, user interface 310 can allow for definition of a pattern of neurostimulation pulses for delivery during a neurostimulation therapy session by creating and/or adjusting one or more stimulation waveforms using a graphical method. The definition can also include definition of one or more stimulation fields each associated with one or more pulses in the pattern of neurostimulation pulses. As used in this document, a "neurostimulation program" can include the pattern of neurostimulation pulses including the one or more stimulation fields, or at least various aspects or parameters of the pattern of neurostimulation pulses including the one or more stimulation fields. In various embodiments, user interface 310 includes a GUI that allows the user to define the pattern of neurostimulation pulses and perform other functions, including composition of the sequence of sensing blocks, using graphical methods. In this document, "neurostimulation programming" can include the definition of the one or more stimulation waveforms, including the definition of one or more stimulation fields.

In various embodiments, circuits of neurostimulation system 100, including its various embodiments discussed in this document, may be implemented using a combination of hardware and software. For example, the circuit of user interface 110, control circuit 214, programming control circuit 316, stimulation programming circuit 320, and sensing programming circuit 360, including their various embodiments discussed in this document, may be implemented using an application-specific circuit constructed to perform one or more particular functions and/or a general-purpose circuit programmed to perform such function(s). Such a general-purpose circuit can include, but is not limited to, a microprocessor or a portion thereof, a microcontroller or portions thereof, and/or a programmable logic circuit or a portion thereof.

Figure 4:
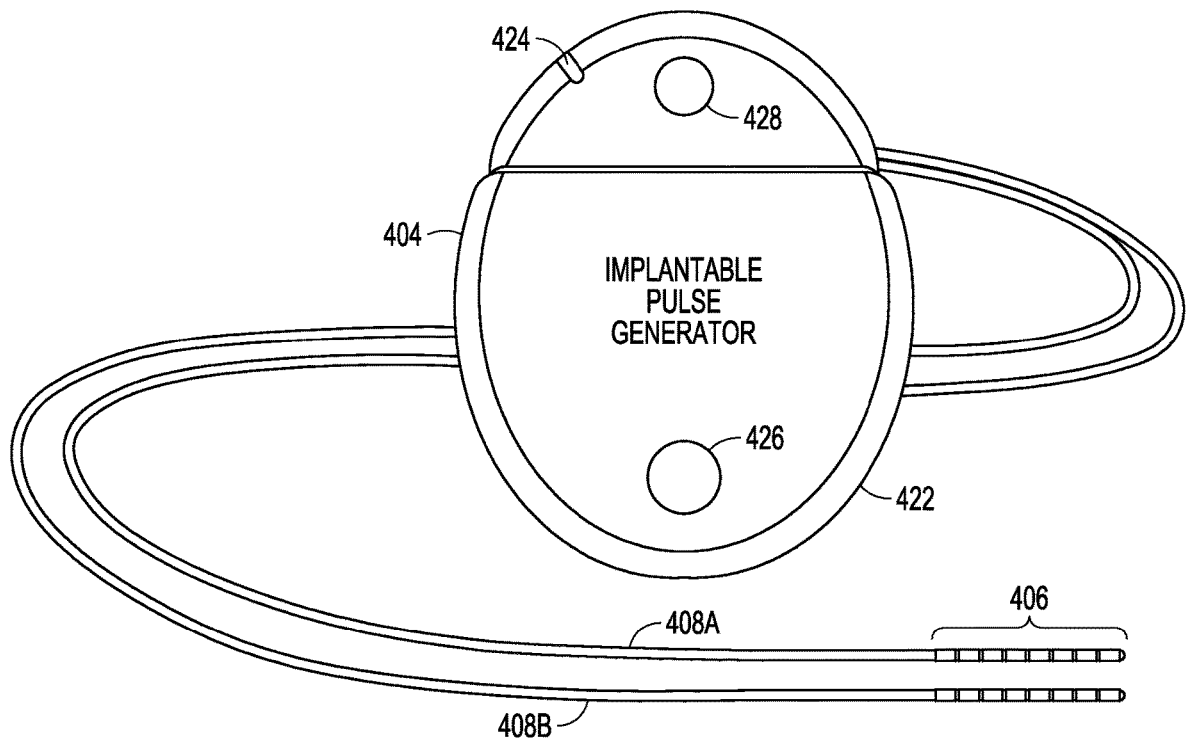
FIG. 4 illustrates an embodiment of an implantable pulse generator (IPG) and an implantable lead system, such as an example implementation of the stimulation device and lead system of FIG. 2.

FIG. 4 illustrates an embodiment of an implantable pulse generator (IPG) 404 and an implantable lead system 408. IPG 404 represents an example implementation of stimulation device 204. Lead system 408 represents an example implementation of lead system 208. As illustrated in FIG. 4, IPG 404 that can be coupled to implantable leads 408A and 408B at a proximal end of each lead. The distal end of each lead includes electrical contacts or electrodes 406 for contacting a tissue site targeted for electrical neurostimulation. As illustrated in FIG. 4, leads 408A and 408B each include 8 electrodes 406 at the distal end. The number and arrangement of leads 408A and 408B and electrodes 406 as shown in FIG. 4 are only an example, and other numbers and arrangements are possible. In various embodiments, the electrodes are ring electrodes. In various embodiments applying DBS or SCS, the implantable leads and electrodes may be configured by shape and size to provide electrical neurostimulation energy to a neuronal target included in the patient's brain or configured to provide electrical neurostimulation energy to target nerve cells in the patient's spinal cord.

Figure 5:
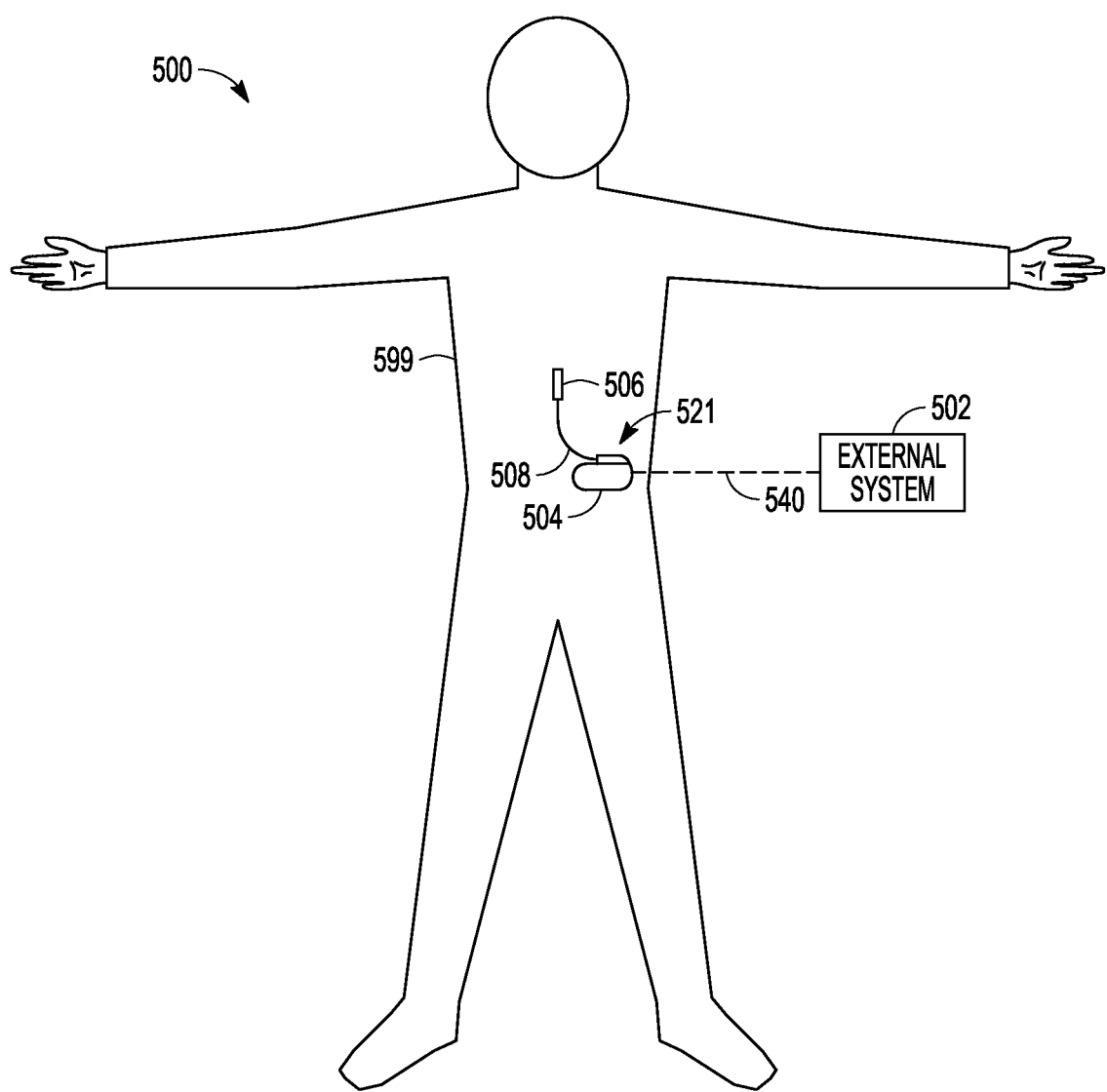
FIG. 5 illustrates an embodiment of an IPG and an implantable lead system, such as the IPG and lead system of FIG. 4, arranged to provide neurostimulation to a patient.

FIG. 5 illustrates an implantable neurostimulation system 500 and portions of an environment in which system 500 may be used. System 500 includes an implantable system 521, an external system 502, and a telemetry link 540 providing for wireless communication between implantable system 521 and external system 502. Implantable system 521 is illustrated in FIG. 5 as being implanted in the patient's body 599. In various embodiments, the arrangements can be different, depending on the part of the nervous system being targeted (e.g., brain, spinal cord, or peripheral nerves), with FIG. 5 showing an example for illustrative purposes only.

Implantable system 521 includes an implantable stimulator (also referred to as an implantable pulse generator, or IPG) 504, a lead system 508, and electrodes 506, which represent an example of stimulation device 204, lead system 208, and electrodes 206, respectively. External system 502 represents an example of programming device 302. In various embodiments, external system 502 includes one or more external (non-implantable) devices each allowing the user and/or the patient to communicate with implantable system 521. In some embodiments, external system 502 includes a programming device intended for the user to initialize and adjust settings for implantable stimulator 504 and a remote control device intended for use by the patient. For example, the remote control device may allow the patient to turn implantable stimulator 504 on and off and/or adjust certain patient-programmable parameters of the plurality of stimulation parameters.

The sizes and shapes of the elements of implantable system 521 and their location in body 599 are illustrated by way of example and not by way of restriction. An implantable system is discussed as a specific application of the programming according to various embodiments of the present subject matter. In various embodiments, the present subject matter may be applied in programming any type of stimulation device that uses electrical pulses as stimuli, regarding less of stimulation targets in the patient's body and whether the stimulation device is implantable.

Returning to FIG. 4, the IPG 404 can include a hermetically sealed IPG case 422 to house the electronic circuitry of IPG 404. IPG 404 can include an electrode 426 formed on IPG case 422. IPG 404 can include an IPG header 424 for coupling the proximal ends of leads 408A and 408B. IPG header 424 may optionally also include an electrode 428. Electrodes 426 and/or 428 represent embodiments of electrode(s) 207 and may each be referred to as a reference electrode. Neurostimulation energy can be delivered in a monopolar (also referred to as unipolar) mode using electrode 426 or electrode 428 and one or more electrodes selected from electrodes 406. Neurostimulation energy can be delivered in a bipolar mode using a pair of electrodes of the same lead (lead 408A or lead 408B). Neurostimulation energy can be delivered in an extended bipolar mode using one or more electrodes of a lead (e.g., one or more electrodes of lead 408A) and one or more electrodes of a different lead (e.g., one or more electrodes of lead 408B).

The electronic circuitry of IPG 404 can include a control circuit that controls delivery of the neurostimulation energy. The control circuit can include a microprocessor, a digital signal processor, application specific integrated circuit (ASIC), or other type of processor, interpreting or executing instructions included in software or firmware. The neurostimulation energy can be delivered according to specified (e.g., programmed) modulation parameters. Examples of setting modulation parameters can include, among other things, selecting the electrodes or electrode combinations used in the stimulation, configuring an electrode or electrodes as the anode or the cathode for the stimulation, specifying the percentage of the neurostimulation provided by an electrode or electrode combination, and specifying stimulation pulse parameters. Examples of pulse parameters include, among other things, the amplitude of a pulse (specified in current or voltage), pulse duration (e.g., in microseconds), pulse rate (e.g., in pulses per second), and parameters associated with a pulse train or pattern such as burst rate (e.g., an "on" modulation time followed by an "off" modulation time), amplitudes of pulses in the pulse train, polarity of the pulses, etc.

Figure 6:
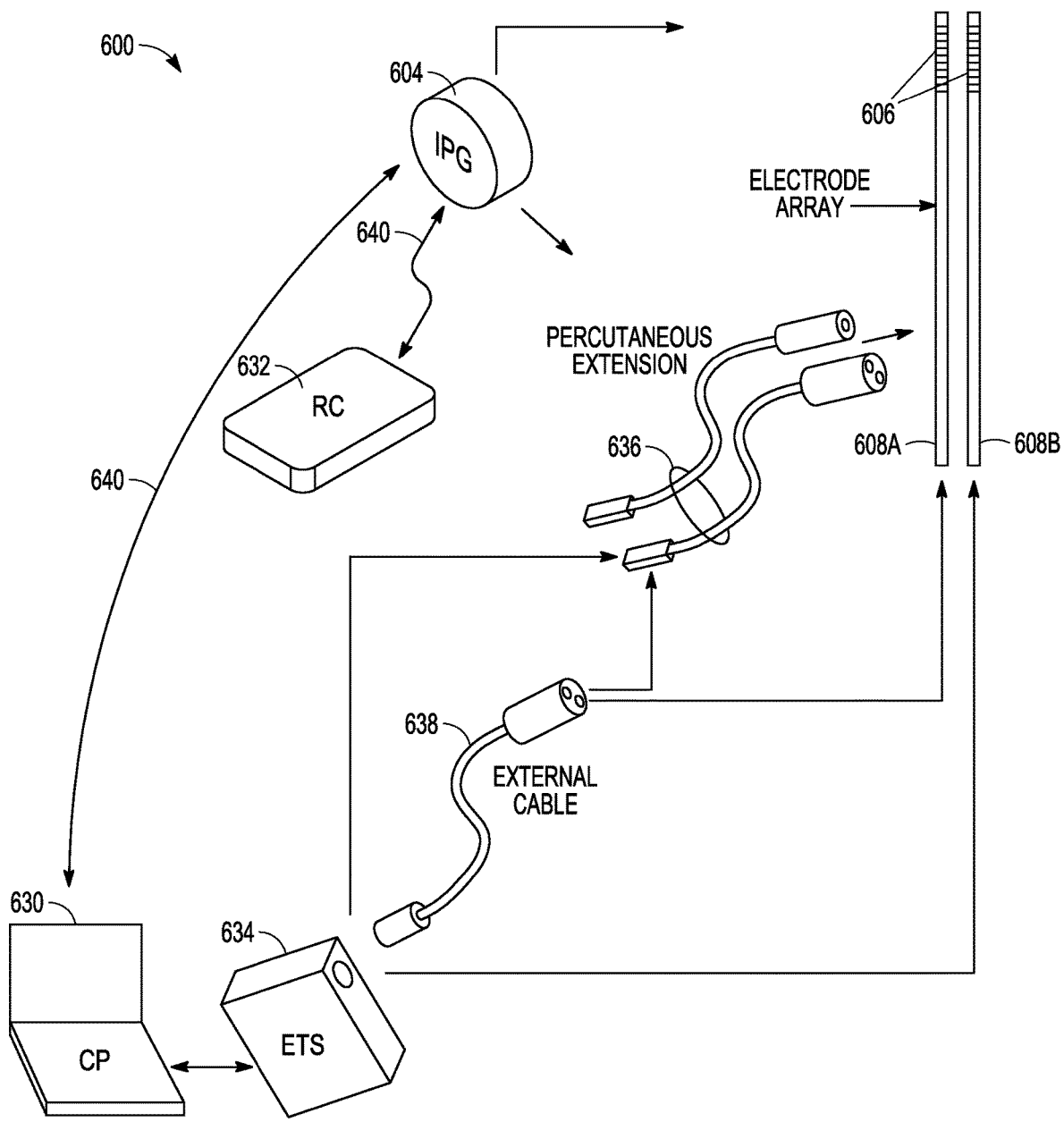
FIG. 6 illustrates an embodiment of portions of a neurostimulation system.

FIG. 6 illustrates an embodiment of portions of a neurostimulation system 600. System 600 includes an IPG 604, implantable neurostimulation leads 608A and 608B, an external remote controller (RC) 632, a clinician's programmer (CP) 630, and an external trial stimulator (ETS, also referred to as external trial modulator, or ETM) 634. IPG 604 may be electrically coupled to leads 608A and 608B directly or through percutaneous extension leads 636. ETS 634 may be electrically connectable to leads 608A and 608B via one or both of percutaneous extension leads 636 and/or external cable 638. System 600 represents an example of system 100, with IPG 604 representing an embodiment of stimulation device 104, electrodes 606 of leads 608A and 608B representing electrodes 106, and CP 630, RC 632, and ETS 634 collectively representing programming device 102.

ETS 634 may be standalone or incorporated into CP 630. ETS 634 may have similar pulse generation circuitry as IPG 604 to deliver neurostimulation energy according to specified modulation parameters as discussed above. ETS 634 is an external device configured for ambulatory use and may be used as a preliminary stimulator after leads 408A and 408B have been implanted and used prior to stimulation with IPG 604 to test the patient's responsiveness to the stimulation that is to be provided by IPG 604. ETS 634 may include cable connectors allowing it to readily interface the proximal end of external leads that are chronic use and may include replaceable batteries.

CP 630 can configure the neurostimulation provided by ETS 634. If ETS 634 is not integrated into CP 630, CP 630 may communicate with ETS 634 using a wired connection (e.g., over a USB link) or by wireless telemetry using a wireless communications link 640. CP 630 also communicates with IPG 604 using a wireless communications link 640.

An example of wireless telemetry is based on inductive coupling between two closely placed coils using the mutual inductance between these coils. This type of telemetry is referred to as inductive telemetry or near-field telemetry because the coils must typically be closely situated for obtaining inductively coupled communication. IPG 604 can include the first coil and a communication circuit. CP 630 can include or otherwise electrically connected to the second coil such as in the form of a wand that can be place near IPG 604. Another example of wireless telemetry includes a far-field telemetry link, also referred to as a radio frequency (RF) telemetry link. A far-field, also referred to as the Fraunhofer zone, refers to the zone in which a component of an electromagnetic field produced by the transmitting electromagnetic radiation source decays substantially proportionally to 1/r, where r is the distance between an observation point and the radiation source. Accordingly, far-field refers to the zone outside the boundary of $r=\lambda/2\pi$, where $\lambda$, is the wavelength of the transmitted electromagnetic energy. In one example, a communication range of an RF telemetry link is at least six feet but can be as long as allowed by the particular communication technology. RF antennas can be included, for example, in the header of IPG 604 and in the housing of CP 630, eliminating the need for a wand or other means of inductive coupling. An example is such an RF telemetry link is a Bluetooth® wireless link.

CP 630 can be used to set modulation parameters for the neurostimulation after IPG 604 has been implanted. This allows the neurostimulation to be tuned if the requirements for the neurostimulation change after implantation. CP 630 can also upload information from IPG 604.

RC 632 also communicates with IPG 604 using a wireless link 640. RC 632 may be a communication device used by the user or given to the patient. RC 632 may have reduced programming capability compared to CP 630. This allows the user or patient to alter the neurostimulation therapy but does not allow the patient full control over the therapy. For example, the patient may be able to increase the amplitude of neurostimulation pulses or change the time that a pre-programmed stimulation pulse train is applied. RC 632 may be programmed by CP 630. CP 630 may communicate with the RC 632 using a wired or wireless communications link. In some embodiments, CP 630 can program RC 632 when remotely located from RC 632.

Figure 7:
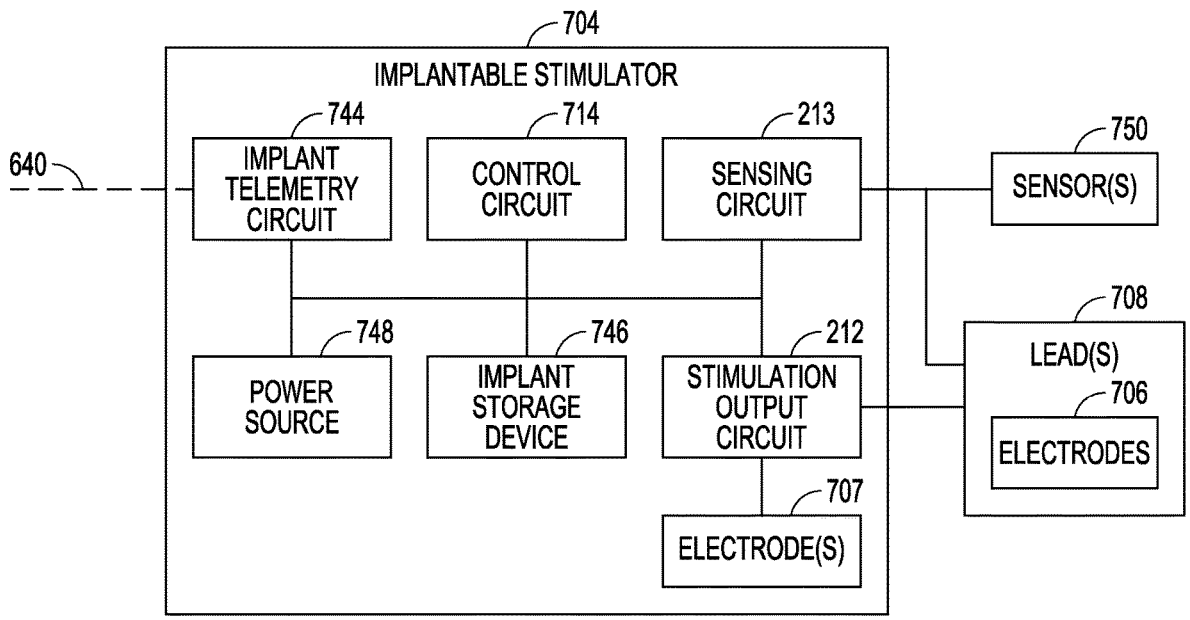
FIG. 7 illustrates an embodiment of an implantable stimulator, one or more leads, and one or more sensors of a neurostimulation system, such as the neurostimulation system of FIG. 6.

FIG. 7 illustrates an embodiment of implantable stimulator 704, one or more leads 708, and one or more sensor(s) 750 of a neurostimulation system, such as system 600. Implantable stimulator 704 represents an example of stimulation device 104 or 204 and may be implemented, for example, as IPG 604. Lead(s) 708 represents an example of lead system 208 and may be implemented, for example, as implantable leads 608A and 608B. Lead(s) 708 includes electrodes 706, which represents an example of electrodes 106 or 206 and may be implemented as electrodes 606.

Implantable stimulator 704 includes sensing circuit 213, stimulation output circuit 212, a control circuit 714, an implant storage device 746, an implant telemetry circuit 744, a power source 748, and one or more electrodes 707. Sensing circuit 213 senses one or more physiological signals for purposes of patient monitoring and/or feedback control of the neurostimulation. Examples of the one or more physiological signals include neural and other signals each indicative of a condition of the patient that is treated by the neurostimulation and/or a response of the patient to the delivery of the neurostimulation (including but not limited to the target neural signals discussed in this document). In various embodiments, sensing circuit 742 senses one or more neural signals using at least electrodes 706 and receives one or more signals sensed by sensor(s) 750. Stimulation output circuit 212 is electrically connected to electrodes 706 through one or more leads 708 as well as electrodes 707 and delivers each of the neurostimulation pulses through a set of electrodes selected from electrodes 706 and electrode(s) 707. Control circuit 714 represents an example of control circuit 214 and controls the delivery of the neurostimulation pulses using the plurality of stimulation parameters specifying the pattern of neurostimulation pulses. In various embodiments, control circuit 714 controls the delivery of the neurostimulation pulses using the one or more sensed signals. Implant telemetry circuit 744 provides implantable stimulator 704 with wireless communication with another device such as CP 630 and RC 632, including receiving values of the plurality of stimulation parameters from the other device. Implant storage device 746 can store one or more neurostimulation programs and values of the plurality of stimulation parameters for each of the one or more neurostimulation programs. Power source 748 provides implantable stimulator 704 with energy for its operation. In one embodiment, power source 748 includes a battery. In one embodiment, power source 748 includes a rechargeable battery and a battery charging circuit for charging the rechargeable battery. Implant telemetry circuit 744 may also function as a power receiver that receives power transmitted from an external device through an inductive couple. Electrode(s) 707 allow for delivery of the neurostimulation pulses in the monopolar mode. Examples of electrode(s) 707 include electrode 426 and electrode 418 in IPG 404 as illustrated in FIG. 4. Sensor(s) 750 sense(s) one or more signals used for controlling the neurostimulation. In various embodiments, sensor(s) 750 can be included in implantable stimulator 704, implantable in the patient separately from implantable stimulator 704, externally worn by the patient, and/or remote from the patient, as further discussed below with reference to FIG. 10.

In one embodiment, implantable stimulator 704 is used as a master database. A patient implanted with implantable stimulator 704 (such as may be implemented as IPG 604) may therefore carry patient information needed for his or her medical care when such information is otherwise unavailable. Implant storage device 746 is configured to store such patient information. For example, the patient may be given a new RC 632 (e.g., by installing a new application in a smart device such as a smartphone) and/or travel to a new clinic where a new CP 630 is used to communicate with the device implanted in him or her. The new RC 632 and/or CP 630 can communicate with implantable stimulator 704 to retrieve the patient information stored in implant storage device 746 through implant telemetry circuit 744 and wireless communication link 640 and allow for any necessary adjustment of the operation of implantable stimulator 704 based on the retrieved patient information. In various embodiments, the patient information to be stored in implant storage device 746 may include, for example, positions of lead(s) 708 and electrodes 706 relative to the patient's anatomy (transformation for fusing computerized tomogram (CT) of post-operative lead placement to magnetic resonance imaging (MRI) of the brain), clinical effect map data, objective measurements using quantitative assessments of symptoms (for example using micro-electrode recording, accelerometers, and/or other sensors), any of the physiological sensed data or features extracted from the sensed data, and/or any other information considered important or useful for providing adequate care for the patient. In various embodiments, the patient information to be stored in implant storage device 746 may include data transmitted to implantable stimulator 704 for storage as part of the patient information and data acquired by implantable stimulator 704, such as by using sensing circuit 213.

In various embodiments, sensing circuit 213, stimulation output circuit 212, control circuit 714, implant telemetry circuit 744, implant storage device 746, and power source 748 are encapsulated in a hermetically sealed implantable housing or case, and electrode(s) 707 are formed or otherwise incorporated onto the case. In various embodiments, lead(s) 708 are implanted such that electrodes 706 are placed on and/or around one or more targets to which the neurostimulation pulses are to be delivered, while implantable stimulator 704 is subcutaneously implanted and connected to lead(s) 708 at the time of implantation.

Figure 8:
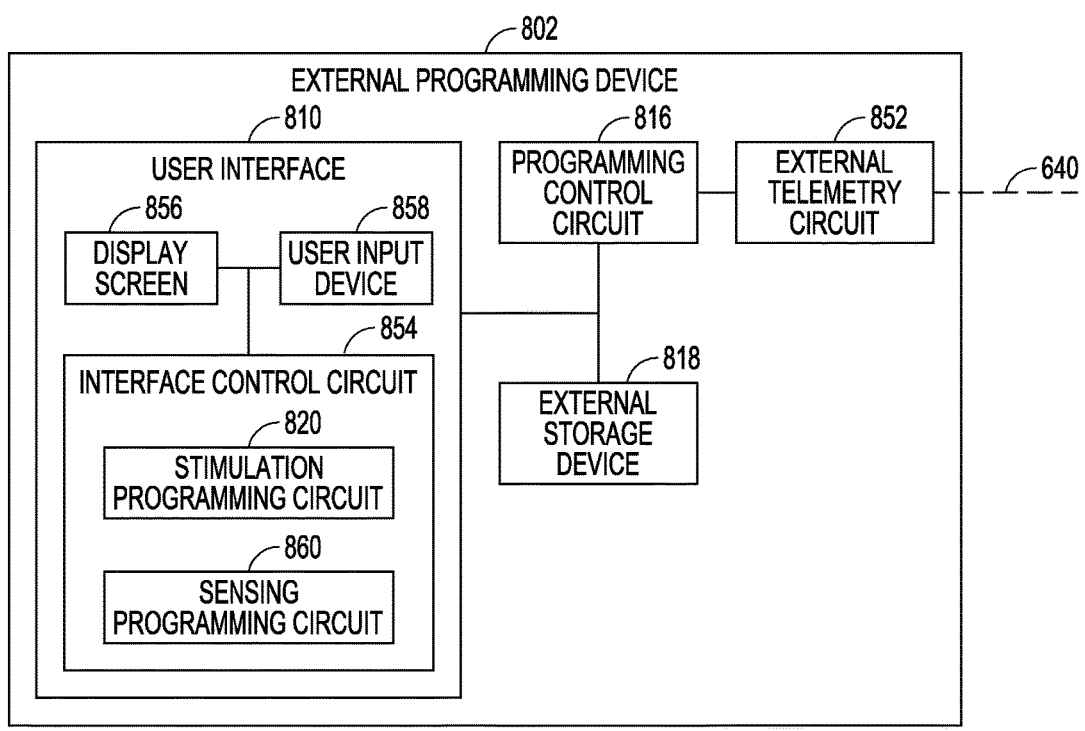
FIG. 8 illustrates an embodiment of an external programming device of a neurostimulation system, such as the neurostimulation system of FIG. 6.

FIG. 8 illustrates an embodiment of an external programming device 802 of a neurostimulation system, such as system 600. External programming device 802 represents an example of programming device 102 or 302, and may be implemented, for example, as CP 630 and/or RC 632. External programming device 802 includes an external telemetry circuit 852, an external storage device 818, a programming control circuit 816, and a user interface 810.

External telemetry circuit 852 provides external programming device 802 with wireless communication with another device such as implantable stimulator 704 via wireless communication link 640, including transmitting the plurality of stimulation parameters to implantable stimulator 704 and receiving information including the patient data from implantable stimulator 704. In one embodiment, external telemetry circuit 852 also transmits power to implantable stimulator 704 through an inductive couple.

In various embodiments, wireless communication link 640 can include an inductive telemetry link (near-field telemetry link) and/or a far-field telemetry link (RF telemetry link). For example, because DBS is often indicated for movement disorders which are assessed through patient activities, gait, balance, etc., allowing patient mobility during programming and assessment is useful. Therefore, when system 600 is intended for applications including DBS, wireless communication link 640 includes at least a far-field telemetry link that allows for communications between external programming device 802 and implantable stimulator 704 over a relative long distance, such as up to about 20 meters. External telemetry circuit 852 and implant telemetry circuit 744 each include an antenna and RF circuitry configured to support such wireless telemetry.

External storage device 818 stores one or more stimulation waveforms for delivery during a neurostimulation therapy session, such as a DBS or SCS therapy session, as well as various parameters and building blocks for defining one or more waveforms. The one or more stimulation waveforms may each be associated with one or more stimulation fields and represent a pattern of neurostimulation pulses to be delivered to the one or more stimulation field during the neurostimulation therapy session. In various embodiments, each of the one or more stimulation waveforms can be selected for modification by the user and/or for use in programming a stimulation device such as implantable stimulator 704 to deliver a therapy. In various embodiments, each waveform in the one or more stimulation waveforms is definable on a pulse-by-pulse basis, and external storage device 818 may include a pulse library that stores one or more individually definable pulse waveforms each defining a pulse type of one or more pulse types. External storage device 818 also stores one or more individually definable stimulation fields. Each waveform in the one or more stimulation waveforms is associated with at least one field of the one or more individually definable stimulation fields. Each field of the one or more individually definable stimulation fields is defined by a set of electrodes through a neurostimulation pulse is delivered. In various embodiments, each field of the one or more individually definable fields is defined by the set of electrodes through which the neurostimulation pulse is delivered and a current distribution of the neurostimulation pulse over the set of electrodes. In one embodiment, the current distribution is defined by assigning a fraction of an overall pulse amplitude to each electrode of the set of electrodes. Such definition of the current distribution may be referred to as "fractionalization" in this document. In another embodiment, the current distribution is defined by assigning an amplitude value to each electrode of the set of electrodes. For example, the set of electrodes may include 2 electrodes used as the anode and an electrode as the cathode for delivering a neurostimulation pulse having a pulse amplitude of 4 mA. The current distribution over the 2 electrodes used as the anode needs to be defined. In one embodiment, a percentage of the pulse amplitude is assigned to each of the 2 electrodes, such as 75% assigned to electrode 1 and 25% to electrode 2. In another embodiment, an amplitude value is assigned to each of the 2 electrodes, such as 3 mA assigned to electrode 1 and 1 mA to electrode 2. Control of the current in terms of percentages allows precise and consistent distribution of the current between electrodes even as the pulse amplitude is adjusted. It is suited for thinking about the problem as steering a stimulation locus, and stimulation changes on multiple contacts simultaneously to move the locus while holding the stimulation amount constant. Control and displaying the total current through each electrode in terms of absolute values (e.g., mA) allows precise dosing of current through each specific electrode. It is suited for changing the current one contact at a time (and allows the user to do so) to shape the stimulation like a piece of clay (pushing/pulling one spot at a time).

Programming control circuit 816 represents an example of programming control circuit 316. Programming control circuit 816 generates the programming information including data representing the stimulation and sensing parameters to be transmitted to implantable stimulator 704. The neurostimulation program and sensing configuration may be created and/or adjusted by the user using user interface 810 and stored in external storage device 818. In various embodiments, programming control circuit 816 can check values of the plurality of stimulation parameters and/or the plurality of sensing parameters against safety rules to limit these values within constraints of the safety rules. In one embodiment, the safety rules are heuristic rules.

User interface 810 represents an example of user interface 310 and allows the user to define the pattern of neurostimulation pulses and perform various other monitoring and programming tasks. User interface 810 includes a display screen 856, a user input device 858, and an interface control circuit 854. Display screen 856 may include any type of interactive or non-interactive screens, and user input device 858 may include any type of user input devices that supports the various functions discussed in this document, such as touchscreen, keyboard, keypad, touchpad, trackball, joystick, and mouse. In one embodiment, user interface 810 includes a GUI. The GUI may also allow the user to perform any functions discussed in this document where graphical presentation and/or editing are suitable as may be appreciated by those skilled in the art.

Interface control circuit 854 controls the operation of user interface 810 including responding to various inputs received by user input device 858 and defining the one or more stimulation waveforms. Interface control circuit 854 can include stimulation programming circuit 820 and a sensing programming circuit 860. Stimulation programming circuit 820 supports composition of neurostimulation waveforms and fields, including neurostimulation programs or patterns of neurostimulation pulses according to which the neurostimulation is delivered. Sensing programming circuit 860 supports composition of the sensing configuration. In various embodiments, stimulation programming circuit 820 and sensing programming circuit can generate the stimulation and sensing parameters according to one or more recording configurations for sensing specified type(s) of neural responses to the neurostimulation, as further discussed below with reference to FIGS. 9-14.

In various embodiments, external programming device 802 can have operation modes including a composition mode (during which the sequence of sensing blocks and/or the pattern of neurostimulation pulses are composed) and a real-time programming mode. Under the composition mode, user interface 810 is activated, while programming control circuit 816 is temporarily deactivated. Programming control circuit 816 does not dynamically updates values of the plurality of stimulation parameters in response to any change in the one or more stimulation waveforms. Under the real-time programming mode, both user interface 810 and programming control circuit 816 are activated. Programming control circuit 816 dynamically updates values of the plurality of stimulation parameters in response to changes in the set of one or more stimulation waveforms and transmits the plurality of stimulation parameters with the updated values to implantable stimulator 704. In various embodiments, the delivery of the neurostimulation is controlled using a closed-loop system with programming control circuit 816 operating in the real-time programming mode, under which both user interface 810 and programing control circuit 816 are activated. Programming control circuit 816 dynamically updates values of the plurality of stimulation parameters in response to changes in one or more sensing algorithms (e.g., programmed in control circuit 714) that follows the sequence of sensing blocks and transmits the plurality of stimulation parameters with the updated values to implantable stimulator 704.

Figure 9:
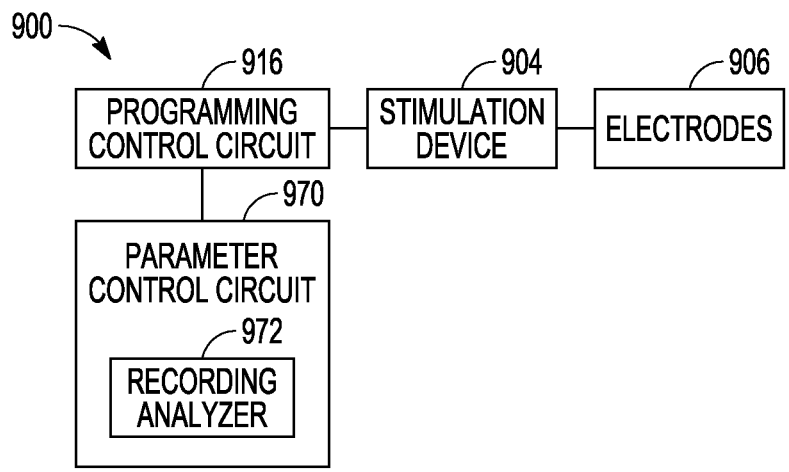
FIG. 9 illustrates an embodiment of a neurostimulation system configured for recording target neural responses.

FIG. 9 illustrates an embodiment of a neurostimulation system 900 that is configured for recording target neural responses. System 900 can be configured to deliver neurostimulation to a patient and sensing one or more signals from the patient using a stimulation device 904 and a plurality of electrodes 906 coupled to stimulation device 904. To control operation of stimulation device 904, system 900 includes a programming control circuit 916 and a parameter control circuit 970. Programming control circuit 916 can control the delivery of the neurostimulation from stimulation device 904 and electrodes 906 according to stimulation parameters and control the sensing of a target neural signal of the one or more signals using stimulation device 904 and electrodes 906 according to sensing parameters. The target neural signal includes target neural responses each being a response of a specified type to the delivery of the neurostimulation. Parameter control circuit 970 can determine the stimulation parameters and the sensing parameters and include a recording analyzer 972. Recording analyzer 972 can determine one or more suitable recording configurations by evaluating a sequence of test recording configurations each including a set of recording configuration parameters selected from the stimulation parameters and the sensing parameters. The one or more suitable recording configurations each have values of the set of recording configuration parameters allowing for detection of the target neural responses from the sensed target neural signal. In various embodiments, recording analyzer 972 can determine one or more optimal recording configurations by evaluating the sequence of test recording configurations. An optimal recording configuration can provide for optimal performance in detecting the target neural responses, such as by providing a maximum signal-to-noise ratio and/or a maximum feature magnitude (e.g., amplitude or other measure of a morphologic feature) of the sensed target neural signal.

System 900 can be implemented in neurostimulation systems including but not limited to those discussed in this document, such as systems 100, 500, and 600. Electrodes 906 can in implemented in lead system 208 (including its various embodiments including electrodes 206, 406, 506, 606, and/or 706) and electrode(s) 207 (including its various embodiments including electrodes 426, 428, and/or 707). Stimulation device 904 can be implemented in, for example, stimulation device 104, stimulation device 204, IPG 404, implantable stimulator 504, IPG 604, or implantable stimulator 704. Programming control circuit 916 and parameter control circuit 970 can be implemented in, for example, programming device 102, programming device 302, external system 502, CP 630, RC 632, or external programming device 802.

In various embodiments, the target neural signal can be a neural signal such as a neural signal sensed using electrodes placed in, on, or adjacent the spinal cord of the patient, and the target neural responses include ECAPs. In various other embodiments, the target neural signal can be a neural signal sensed using electrodes placed in, on, or adjacent to the brain (e.g., specific brain structure, nuclei, or tract), or peripheral nerves (e.g., vagus nerve or other nerves). Stimulation device 904 includes an implantable stimulator, and an external programming device can communicate with the implantable stimulator via telemetry and include programming control circuit 916 and parameter control circuit 970. For example, external programming device 802 can be configured to perform the functions of programming control circuit 916 and parameter control circuit 970, with programming control circuit 816 configured to include programming control circuit 916 and interface control circuit 854 configured to include parameter control circuit 970. Programming control circuit 916 can control the delivery of the neurostimulation and the sensing of the one or more signals by generating programming information to be transmitted to the implantable stimulator for controlling the delivery of the neurostimulation according to the stimulation parameters and controlling sensing of one or more signals according to the sensing parameters.

Figure 10:
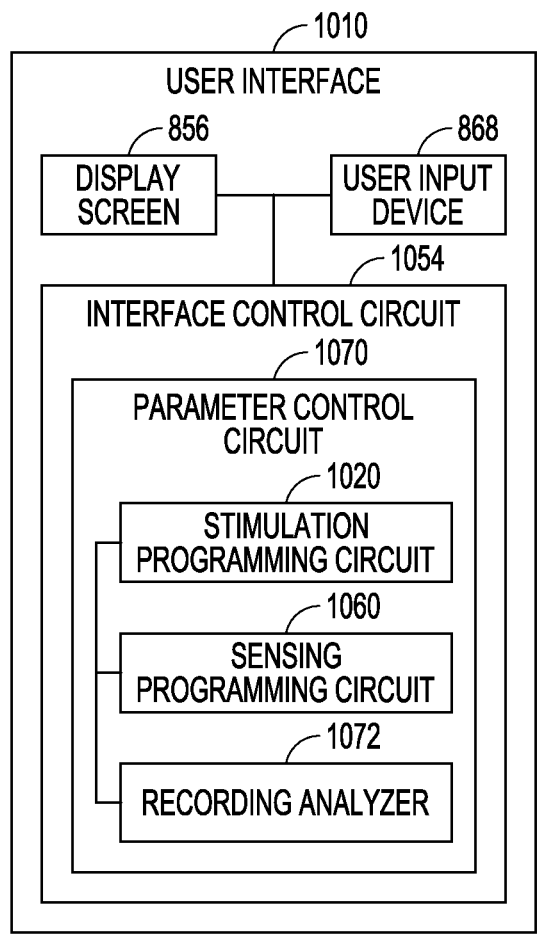
FIG. 10 illustrates an embodiment of a user interface configured for recording target neural responses, such as may be implemented in the neurostimulation system of FIG. 9.

FIG. 10 illustrates an embodiment of a user interface 1010 that can be configured for recording target neural responses, such as may be implemented in system 900. For example, when external programming device 802 is configured to perform the functions of programming control circuit 916 and parameter control circuit 970, user interface 810 can be configured to include the elements and perform the functions of user interface 1010.

As illustrated in FIG. 10, user interface 1010 includes a display screen 856, a user input device 858, and an interface control circuit 1054. Interface control circuit 1054 can represent an example of interface control circuit 854 and includes a parameter control circuit 1070. Parameter control circuit 1070 can represent an example of parameter control circuit 970 and includes a stimulation programming circuit 1020, a sensing programming circuit 1060, and a recording analyzer 1072. Stimulation programming circuit 1020 can represent an example of stimulation programming circuit 320 or 820 and can generate the stimulation parameters according to commands and information received by user input device 858, stored in a storage device such as external storage device 818, and/or produced by recording analyzer 1072. Sensing programming circuit 1060 can represent an example of sensing programming circuit 360 or 860 and can generate the sensing parameters according to commands and information received by user input device 858, stored in a storage device such as external storage device 818, and/or produced by recording analyzer 1072. Recording analyzer 1072 can represent an example of recording analyzer 972 and can determine the one or more recording configurations for the target neural signal.

In various embodiments, recording analyzer 1072 can determine one or more suitable recording configurations each including a set of recording configuration parameters selected from the stimulation parameters and the sensing parameters for recording the target neural signal with a suitable performance in detecting the target neural responses. The suitable performance can be a performance allowing for reliable detection of the target neural responses. For example, when the target neural responses are EPs, ERNA, or ECAPs, the suitable performance can be a performance allowing for reliable detection morphological features of the EPs, ERNA, or ECAPs, which in turn allows for measuring neural response parameters from the detected morphological features (e.g., as discussed below with reference to FIG. 11). Whether the performance in detecting the target neural responses can be determined using one or more suitability criteria such as (1) the sensed target neural signal has an SNR exceeding a threshold SNR and/or (2) the sensed target neural signal has a feature magnitude exceeding a threshold magnitude (e.g., at a given intensity of the neurostimulation). The feature magnitude can include an amplitude or other parameter that can be measured or otherwise determined from a morphologic feature of the sensed target neural signal, such as the neural response parameters discussed below (using ESG and ECAPs features as examples) with reference to FIG. 11.

In various embodiments, recording analyzer 1072 can determine an optimal recording configuration including a set of recording configuration parameters selected from the stimulation parameters and the sensing parameters for recording the target neural signal with an optimal performance in detecting the target neural responses. While multiple suitable recording configurations are determined, the optimal recording configuration can be the suitable recording configuration that provides for the best performance among all the suitable recording configurations in detecting the target neural responses. Whether the performance in detecting the target neural responses can be determined using one or more optimization criteria such as (1) the sensed target neural signal has the maximum SNR and/or (2) the sensed target neural signal has the maximum amplitude (e.g., with the same intensity of the neurostimulation).

In various embodiments, recording analyzer 1072 can execute a search algorithm for determining the recording configuration by evaluating a sequence of test recording configurations. Using the results of the evaluation, recording analyzer 1072 can select the one or more suitable recording configurations and/or the optical recording configuration from the sequence of test recording configurations. The sequence of test recording configurations can be determined based on a search strategy for the target neural responses. Each recording configuration in the sequence of test recording configurations can include: (1) one or more fixed stimulation parameters and/or one or more sweep stimulation parameters; and (2) one or more fixed sensing parameters and/or one or more sweep sensing parameters. A "fixed" stimulation or sensing parameter has a constant value throughout the sequence. A "sweep" stimulation or sensing parameter has a value range to be swept in the sequence (for identifying one or more suitable or optimal values). Examples of the one or more sweep stimulation parameters include the set of stimulation electrodes selected from the plurality of electrodes (e.g., specified by contacts, fractionalizations, and/or polarities), pulse amplitude, pulse width, pulse frequency, duty cycle, and/or pulse waveform (e.g., charge injection and charge recovery phases and/or interphase interval). The one or more sweep stimulation parameters each have values swept from a specified minimum value to a specified maximum value at a specified increment (e.g., pulse amplitude from 0 mA to 6 mA at 0.5 mA steps, and/or pulse frequency from 0 Hz to 200 Hz at 20 Hz steps). Examples of the one or more sweep sensing parameters include the set of sensing electrodes selected from the plurality of electrodes, amplifier gain, low-pass cutoff frequency, high-pass cutoff frequency, offset compensation, high voltage amplifier, and/or high-pass corner frequency. The one or more sweep sensing parameters each have values swept from a specified minimum value to a specified maximum value at a specified increment. The specified increment can also be variable based on a specified look-up table in relation to the actual sweeping parameter value, or in relation to the neural threshold. For example, if the current amplitude is swept from 0 mA to 11 mA, it can be done initially at 0.05 mA steps, and once the neural response is observed, then the step increments can be reduced to 0.1 mA until side effects are observed or the maximum limit (11 mA in this case) is reached.

In various embodiments, the search strategy can define, for example, the test recording configurations to be included in the sequence of test recording configurations, the order of the test recording configurations in the sequence, the duration of stimulation for each test recording configuration (e.g., 1 second), and the duration of data collection and timing relative to the stimulation for each test recording configuration. The search strategy can be defined prior to executing the search algorithm. In various embodiments, the search strategy can be empirically established, for example by using knowledge of an expert user related to spatial and/or temporal aspects of detecting the target neural responses. In various embodiments, the search strategy can be established, for example:
- to limit the amount of test recording configurations to be included in the sequence;
- to dynamically adjust the sequence based on results that have become available from an ongoing evaluation of the sequence of test recording configurations (e.g., to change the test recording configurations remaining to be evaluated and/or the order of the test recording configurations remaining to be evaluated);
- to test the stimulation parameters and the sensing parameters for data collection over a specified stimulation intensity range; and/or
- to adjust the stimulation delivered to be bursts of pulses with enough time separation between the bursts to allow sensing of the neural response.

In various embodiments, the search strategy is established to reduce programming time for stimulation device 904 to deliver the neurostimulation and to sense the target neural signal, for example when stimulation device 904 controls the delivery of the neurostimulation using the target neural responses.

In one embodiment, the neurostimulation is delivered at the therapeutic neural target where the clinical symptoms are alleviated (e.g. pain relief in chronic pain patients, or tremor is controlled in PD patients), and neural responses are searched using different sensing parameters (e.g., different sensing channels, etc.). However, finding the neural responses can be difficult sometimes, particularly in the case of ECAPs in the spinal cord. Therefore, a neurostimulation strategy specifically designed for sensing can be applied, in which the sensing location is changed in order to search for better ECAP responses. If ECAPs are not detectable with therapeutic stimulation (i.e., the neurostimulation delivered at the therapeutic neural target), then a dual stimulation approach can be implemented using the therapeutic stimulation plus additional neurostimulation delivered at a location near the therapeutic neural target, where potentially less frequent pulses are delivered with the purpose of sensing the ECAPs. In various embodiments, recording analyzer 1072 can control (1) generation of the stimulation and sensing parameters according to the sequence of test recording configurations and (2) data collection during the delivery of the neurostimulation according to the sequence of test recording configurations. The data collection includes recording the target neural signal, with the collected data being indicative of the target neural responses recorded during the delivery of the neurostimulation according to the sequence of test recording configurations. Recording analyzer 1072 can determine the one or more suitable recording configurations and/or the optimal recording configuration by analyzing the collected data.

In various embodiments, recording analyzer 1072 can determine the one or more suitable recording configurations and/or the optimal recording configuration automatically by analyzing the collected data. In various other embodiments, recording analyzer 1072 can determine the one or more suitable recording configurations and/or the optimal recording configuration semi-automatically by analyzing the collected data. For example, recording analyzer 1072 can receive user input using user input device 858 for the determination of the one or more suitable recording configurations and/or the optimal recording configuration. The user input can be based on visual observation of the signals and/or information extracted from the signals presented on display screen 856. In another example, recording analyzer 1072 can guide the user in selecting the one or more suitable or optimal recording configurations using display screen 856 and user input device 858. In yet another example, recording analyzer 1072 can guide the user in defining criteria and/or parameters for evaluating the sequence of test recording configurations.

In various embodiments, recording analyzer 1072 can be used to determine a sensing channel and a set of sensing electrodes for the sensing channel for sensing the target neural signal for therapy control. In various embodiments, recording analyzer 1072 can be used to determine a neural threshold (NT) for recording the target neural signal. The NT is the minimum intensity of the neurostimulation (e.g., pulse amplitude in mA) for which target neural response is detectable (e.g., ECAPs having a minimum amplitude specified in $\mu V$ or ERNA having a minimum amplitude specified in $\mu V$). For example, ECAP threshold (NT for ECAP) can be determined by increasing the pulse amplitude and extracting specified ECAP features. The pulse amplitude at which the extracted ECAP features start to indicate detection of the ECAPs is considered to be the ECAP threshold. Recording analyzer 1072 can recommend values or value ranges for the stimulation parameters to allow for reliable detection of the target neural responses (e.g., including reliable detection of specified ECAP features). In various embodiments, recording analyzer 1072 can be used to recommend features of the target neural response to be used in closed-loop control of the delivery of the neurostimulation, which can include detecting morphological features of the target neural signal, generating one or more neural response parameters using the detected features, and using the one or more neural response parameters as input of the closed-loop control.

Figure 11:
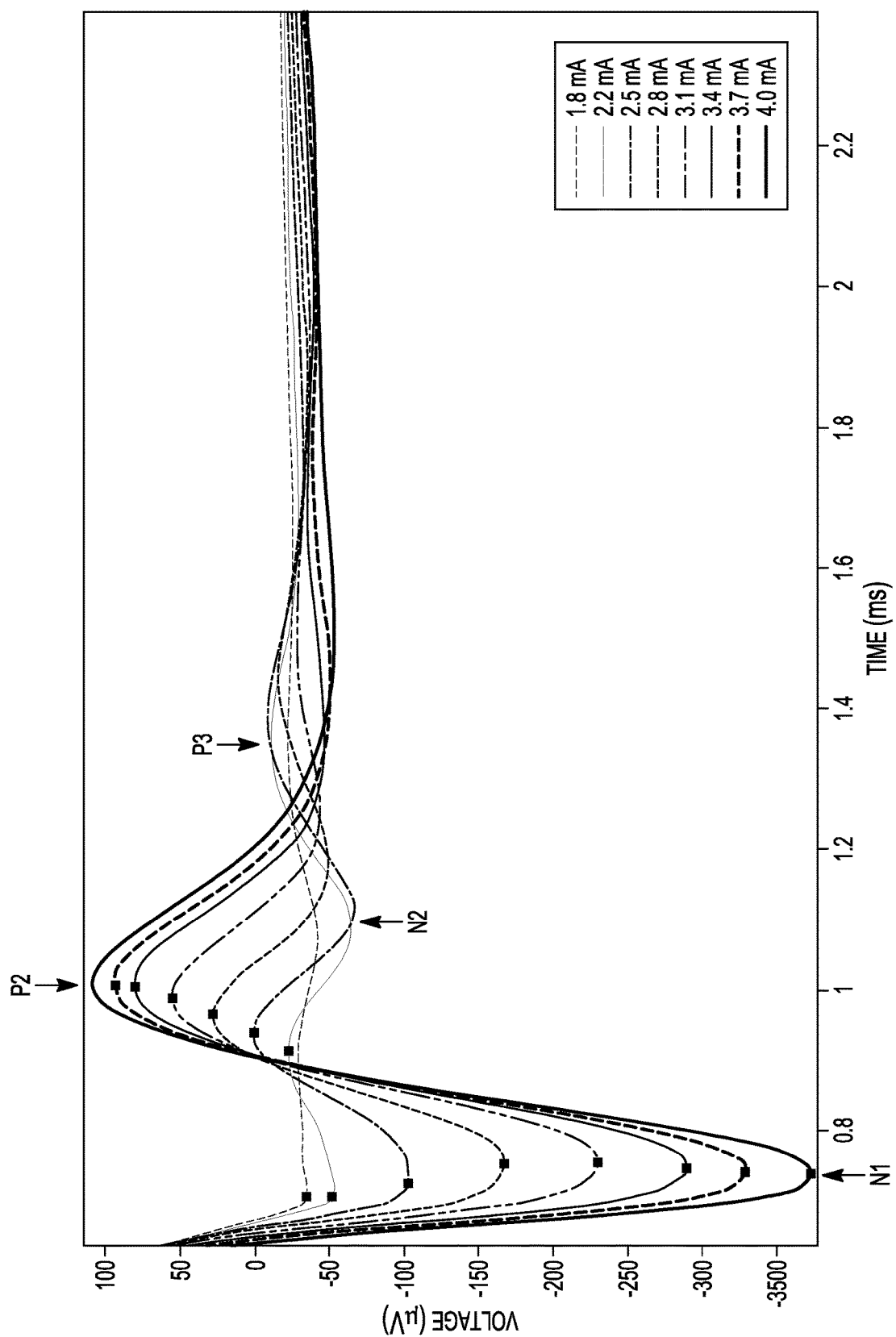
FIG. 11 is a graph showing an example of neural responses evoked by neurostimulation pulses.

FIG. 11 is a graph showing an example of neural responses evoked by neurostimulation pulses. The neural responses as shown are ECAPs indicative of dorsal column responses seen on an electrospinographic (ESG) signal and resulting from neurostimulation with electrical pulses having various amplitudes. A stronger dorsal column response resulting from the neurostimulation with a higher pulse amplitude is characterized by a greater magnitude and different shape including. Examples of morphological features of the target neural signal (ESG including ECAPs) include:
- N1: the first negative peak in an evoked response that is correlated to the response of faster fibers such as AP fibers and myelinated fibers;
- P2: the second positive peak in the evoked response that is correlated with response of slower fibers;
- N2: the second negative peak in the evoked response, possibly correlated with responses of even slower fibers and synaptically activated cells (e.g., neural elements each responding to each stimulus with a long latency); and P3: the third positive peak in the evoked response, also possibly correlated with responses of even slower fibers and synaptically activated cells (e.g., more neural elements each responding to each stimulus with a longer latency).

One or more neural response parameters used for controlling the delivery of the neurostimulation can be derived from such characteristics of the evoked responses as seen on the target neural signal that includes ECAPs. In various embodiments, the one or more neural response parameters can be measured from the target neural signal and/or a derivative of the target neural signal. It is noted that ESG is shown in FIG. 11 as an example, while the present subject matter can apply to other types of neural signals. It is also noted that FIG. 11 shows the ESG segment that starts 0.5 ms after the stimulus that evoked ECAPs and therefore does not show P1, which is the first positive peak in the evoked response but is often obscured by the stimulus artifact.

In various embodiments, the analysis of the collected data according to the search strategy as discussed above can include detecting and measuring the target neural responses (e.g., ECAPs). The target neural responses can each include the response evoked by a stimulus such as a stimulation pulse or any unit of stimulation considered to be a single stimulus. Examples of the one or more neural response parameters generated by detecting and measuring ECAP features for analyzing the collected data and/or controlling the delivery of the neurostimulation during a therapy include:

Amplitude range: N1 to P2 amplitude (the difference between amplitudes of N1 and P2);

Overall curve length (CL): duration of an evoked response measured from the ESG signal which can be determined using:

$$CL = \sum_{n=2}^{N-1} |y(n) - y(n-1)|,$$

where CL is the curve length;
N1 to P2 curve length;
Area under the curve (AUC): the area between the target neural signal and a baseline for an evoked response or another specified period, also referred to curve area in this document), which can be determined using:

$$A = \sum_{n=1}^{N} |y(n)|,$$

where A is the area under the curve, n is the time index, y is the data time series, and N is the index of the last data sample in the time series;

P2 peak delay, which is the time interval between the neurostimulation pulse and the P2 of the evoked response and is indicative of recruitment of slower (smaller diameter) fibers;

presence of N2 and P3; and curve length of signal derivative (duration of an evoked response measured from a derivative of the target neural signal).

In various embodiments, these parameters can each be used as a feature magnitude as discussed in this document.

Figure 12:
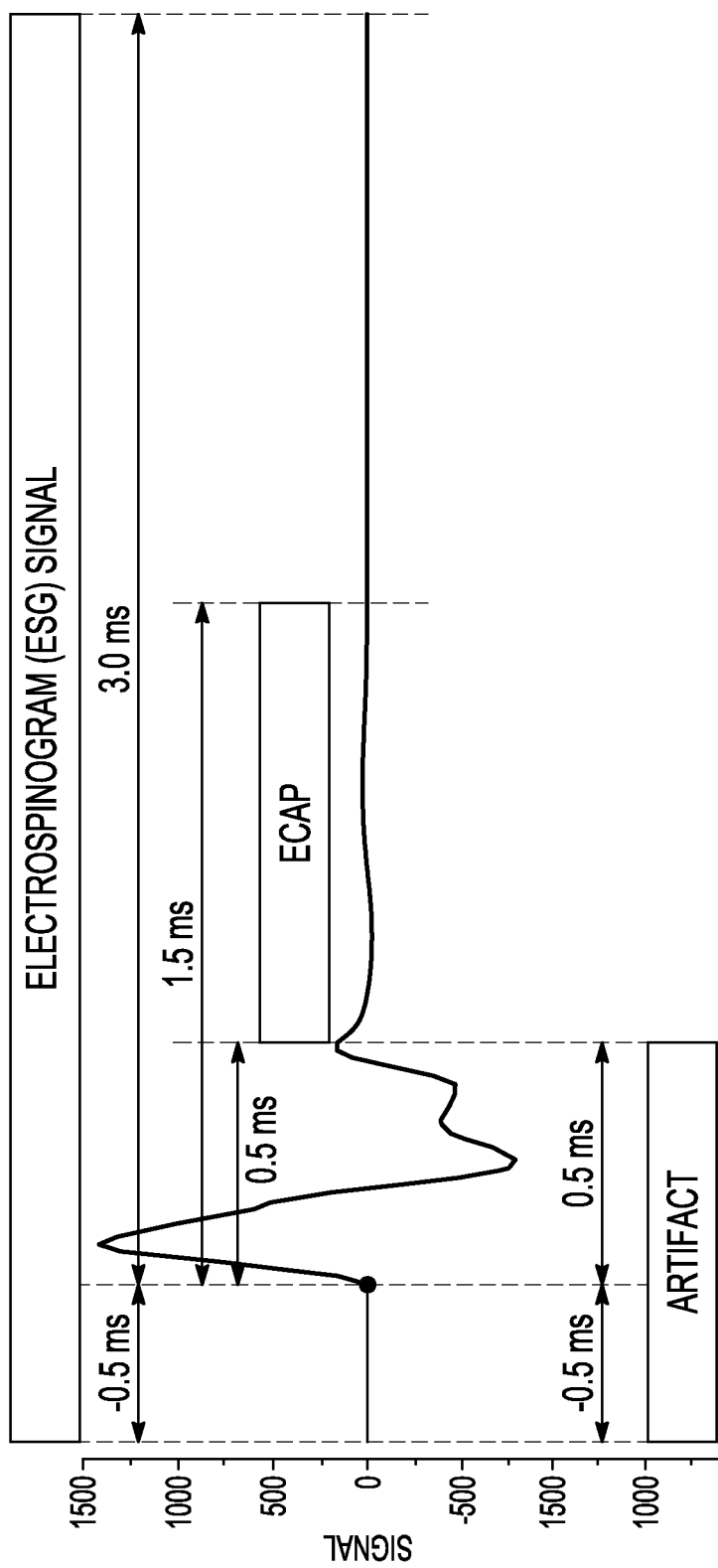
FIG. 12 illustrates an embodiment of epoch windows for processing data collected for analyzing target neural responses.

FIG. 12 illustrates an embodiment of epoch windows for processing data collected for analyzing target neural responses including ECAPs. In various embodiments, the data collected during delivery of the neurostimulation and sensing of the target neural signal according to the sequence of test recording configurations (e.g., execution of the search algorithm) include dividing the collected data into snippets using epoch windows corresponding to a stimulation epoch, such that the data within each snippet corresponds to a stimulus (e.g., an electrical pulse) excluding artifact resulting from that stimulus. The windows can be customized. The collected data in each snippet can be averaged before the morphological features of the target neural signal. In the illustrated embodiment, the epoch winders are determined for detecting ECAPs and include:

a signal window (labeled "ELECTROSPINOGRAM (ESG) SIGNAL) having the duration of the stimulation epoch;

an artifact window (Labeled "ARTIFACT") during which the stimulus artifact is anticipated; and an ECAP window (Labeled "ECAP") during which the ECAPs including the morphological features to be detected are anticipated.

In various embodiments, the collected data in each snippet include the data within in ECAP window or the data within the signal window excluding the artifact window. It is noted that ESG is shown in FIG. 12 as an example, while the present subject matter can apply to other types of neural signals.

Figure 13:
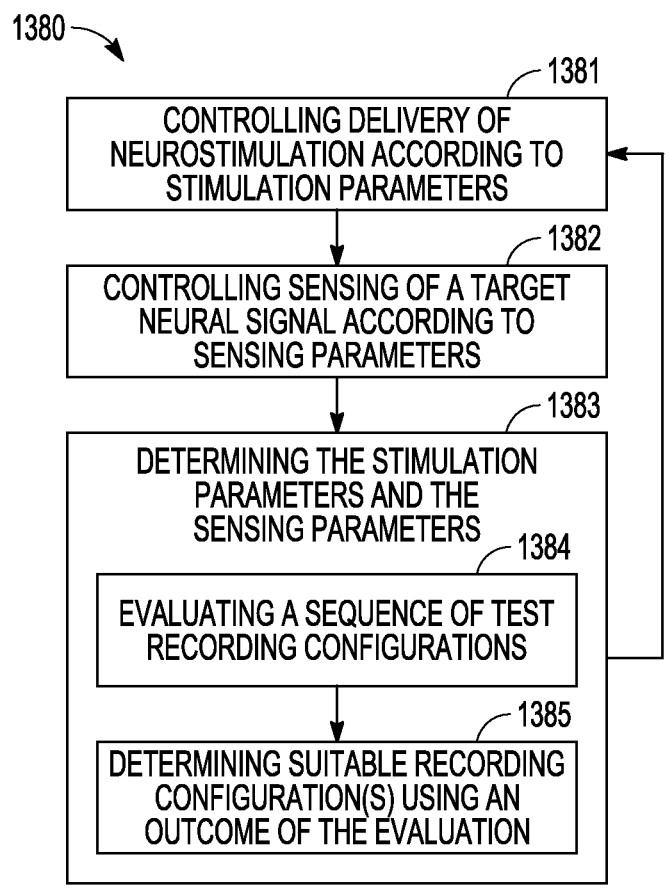
FIG. 13 illustrates an embodiment of a method for determining recording configurations for target neural responses using a system including a processor.

FIG. 13 illustrates an embodiment of a method 1380 for determining recording configurations for target neural responses using a system including a processor. Method 1380 can be performed for delivering neurostimulation to a patient and sensing one or more signals from the patient using a stimulation device and a plurality of electrodes coupled to the stimulation device. In various embodiments, method 1380 can be performed using system 900, with programming control circuit 916 and parameter control circuit 970 or 1070 implemented using a processor configured for performing method 1380. A non-transitory computer-readable storage medium is used to store instructions, which when executed by the processor, cause the processor to perform method 1380. In various embodiments, method 1380 can be performed using a specialized programmer or using a generic device, such as a computer, a tablet device, or a smartphone with an application installed for performing the method.

At 1381, the delivery of the neurostimulation is controlled according to stimulation parameters. At 1382, the sensing of a target neural signal of the one or more signals is controlled according to sensing parameters. The target neural signal includes target neural responses each being a response of a specified type to the delivery of the neurostimulation. For example, the target neural signal can be a neural signal sensed from the spinal cord of the patient and can include ECAPs.

At 1383, the stimulation parameters and the sensing parameters are determined. This includes evaluating a sequence of test recording configurations at 1384 and determining one or more suitable recording configurations using an outcome of the evaluation at 1385. The test recording configurations each include set of recording configuration parameters selected from the stimulation parameters and the sensing parameters. The one or more suitable recording configurations each have values of the set of recording configuration parameters allowing for detection of the target neural responses from the sensed target neural signal. For example, the one or more suitable recording configurations can each have values of the set of recording configuration parameters allowing for automatic detection of one or more specified morphological features of the ECAPs.

In various embodiments, an optimal recording configuration is determined. The optimal recording configuration can be a suitable recording configuration having values of the set of recording configuration parameters optimized for automatic detection of the target neural responses from the sensed target neural signal.

Figure 14:
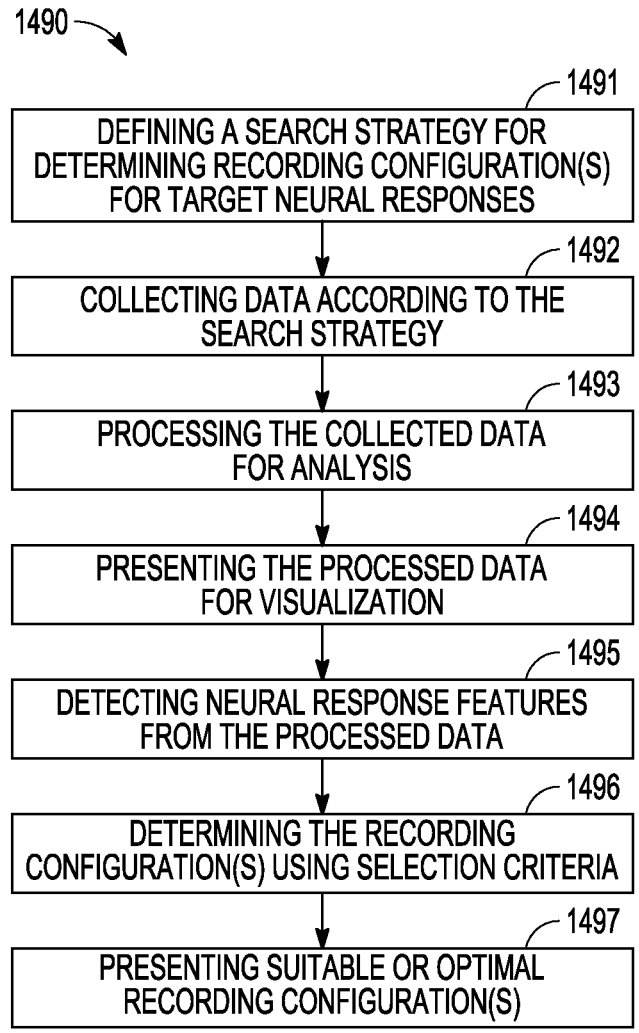
FIG. 14 illustrates an embodiment of a method for recording target neural responses.

FIG. 14 illustrates an embodiment of a method 1490 for recording target neural responses to neurostimulation. In various embodiment, method 1490 can be performed by a user using system 900, and method 1380 is to be performed as part of the performance of method 1490.

At 1491, a search strategy is defined for determining one or more recording configurations for target neural responses. A sequence of test recording configurations is generated according to the search strategy. The sequence of test recording configurations specifies the order of the test recording configurations in the sequence of test recording configurations and timing windows for analyzing a sensed target neural signal relative to each stimulus of the neurostimulation. In various embodiments, the sequence of test recording configurations can be dynamically adjusted during the evaluation of the sequence while the neurostimulation is being delivered according to the sequence based on results that have become available during the evaluation of the sequence of test recording configurations. For example, in response to the target neural responses not being detectable as indicated by the results that have become available (e.g., results from evaluating test recording configurations defining a therapeutic stimulation site), more test recording configurations can be added to add one or more stimulation sites (e.g., at least an additional stimulation site near the therapeutic stimulation site).

At 1492, data representing the sensed target neural signal are collected, according to the search strategy, during the delivery of the neurostimulation according to the sequence of test recording configurations. The collected data are stored for analysis.

At 1492, the collected data are processed for the analysis. The processing can include dividing the collected data into snippets using a window and determining one or more specified morphological features of the target neural responses using the collected data in the snippets. The window can correspond to a stimulation epoch associated with each stimulus of the neurostimulation and excluding artifact resulting from that stimulus. An example of such a window is the ECAP window as illustrated in FIG. 12, when the target neural responses include ECAPs.

At 1494, the processed data are presented for visualization. This can include displaying result of analysis for each test recording configuration. In various embodiments, the processed target neural signal showing the target neural responses, such as the morphological features of the target neural signal, can be displayed.

At 1495, one or more specified types of features of the target neural responses are detected from the processed data. The one or more types are specified according to the search strategy. Examples of the features include morphological features of ECAP as discussed above with reference to FIG. 11. In various embodiments, the features can be detected automatically, and the neural response parameters can be automatically measured and/or calculated from the detected features. In various embodiments, the detected features and/or the neural response parameters are presented for visualization when they become available.

At 1496, the one or more recording configurations for the target neural responses are determined using selection criteria defined according to the search strategy. The one or more recording configurations can include one or more suitable recording configurations selected from the sequence of test recording configurations according to suitability criteria and/or one or more optimal recording configurations selected from the sequence of test recording configurations according to optimization criteria. In various embodiments, the selection criteria can be defined as threshold values of the neural response parameters. In various embodiments, the selection can be made manually by the user (e.g., based on the displayed processed data), automatically, or semi-automatically with user inputs. In various embodiments, a semi-automatic selection can include presenting the processed data (e.g., including the detected features and the neural response parameters) using a user interface and receiving a selection of the one or more suitable and/or optimal recording configurations from the user using the user interface.

At 1497, the one or more one or more suitable and/or optimal recording configurations are presented. In various embodiments, multiple suitable or optimal recording configurations can be ranked by degree of suitability or optimization. The one or more suitable and/or optimal recording configurations provide for one or more recommendations for settings of the stimulation device, including, for example, sensing channels and range of stimulation intensities.

It is to be understood that the above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system for delivering neurostimulation to a patient and sensing one or more signals from the patient using a stimulation device and a plurality of electrodes coupled to the stimulation device, the system comprising:

a programming control circuit configured to control the delivery of the neurostimulation according to stimulation parameters and to control the sensing of a target neural signal of the one or more signals according to sensing parameters, the target neural signal including target neural responses each being a response of a specified type to the delivery of the neurostimulation; and a parameter control circuit configured to determine the stimulation parameters and the sensing parameters, the parameter control circuit including a recording analyzer configured to:

evaluate a sequence of test recording configurations each including a set of recording configuration parameters selected from the stimulation parameters and the sensing parameters, the set of recording configuration parameters including sensing parameters specifying a set of sensing electrodes selected from the plurality of electrodes and controlling processing of the sensed target neural signal; and determine one or more suitable recording configurations using an outcome of the evaluation, the one or more suitable recording configurations each having values of the set of recording configuration parameters allowing for detection of the target neural responses from the processed target neural signal.

2. The system of claim 1, wherein the recording analyzer is configured to determine the one or more suitable recording configurations for detection of evoked compound action potentials (ECAPs).

3. The system of claim 1, wherein the recording analyzer is configured to determine the one or more suitable recording configurations by determining a signal-to-noise ratio (SNR) of the processed target neural signal and comparing the determined SNR to a threshold SNR.

4. The system of claim 1, wherein the recording analyzer is configured to determine the one or more suitable recording configurations by determining feature magnitude of the processed target neural signal and comparing the determined feature magnitude to a threshold magnitude.

5. The system of claim 1, wherein the recording analyzer is configured to determine an optimal recording configuration by evaluating the sequence of test recording configurations, the optimal recording configuration having values of the set of recording configuration parameters optimized for detection of the target neural responses from the processed target neural signal.

6. The system of claim 1, wherein the recording analyzer is configured to evaluate values of one or more stimulation parameters defining an intensity of the neurostimulation, the values of the one or more stimulation parameters swept in the sequence of test recording configurations.

7. The system of claim 6, wherein the recording analyzer is configured to evaluate values of one or more sensing parameters controlling processing of the neural response signal, the values of the one or more sensing parameters swept in the sequence of test recording configurations.

8. The system of claim 1, wherein the recording analyzer is configured to dynamically adjust the sequence of test recording configurations during the evaluation of the sequence of test recording configurations based on results that have become available during the evaluation of the sequence of test recording configurations.

9. The system of claim 1, wherein the recording analyzer is configured to:
control generation of the stimulation parameters and the sensing parameters according to the sequence of test recording configurations;
control data collection during the delivery of the neurostimulation according to the sequence of test recording configurations; and
determine the one or more suitable recording configurations by automatically analyzing the collected data.

10. The system of claim 1, comprising a programming device configured to be communicatively coupled to the stimulation device, the programming device comprising:
the programming control circuit;
a storage device; and
a user interface including a display screen, a user input device, and an interface control circuit including the parameter control circuit,
and wherein the recording analyzer is configured to:
control generation of the stimulation parameters and the sensing parameters according to the sequence of test recording configurations;
control data collection during the delivery of the neurostimulation according to the sequence of test recording configurations; and
guide the determination of the one or more suitable recording configurations using the user interface.

11. A method for delivering neurostimulation to a patient and sensing one or more signals from the patient using a stimulation device and a plurality of electrodes coupled to the stimulation device, the method comprising:
controlling the delivery of the neurostimulation according to stimulation parameters;
controlling the sensing of a target neural signal of the one or more signals according to sensing parameters, the target neural signal including target neural responses each being a response of a specified type to the delivery of the neurostimulation; and
determining the stimulation parameters and the sensing parameters using a processor, including:
evaluating a sequence of test recording configurations each including a set of recording configuration parameters selected from the stimulation parameters and the sensing parameters, the set of recording configuration parameters including sensing parameters specifying a set of sensing electrodes selected from the plurality of electrodes and controlling processing of the sensed target neural signal; and
determining one or more suitable recording configurations using an outcome of the evaluation, the one or more suitable recording configurations each having values of the set of recording configuration parameters allowing for detection of the target neural responses from the processed target neural signal.

12. The method of claim 11, wherein determining the one or more suitable recording configurations comprises determining an optimal recording configuration having values of the set of recording configuration parameters optimized for automatic detection of the target neural responses from the processed target neural signal.

13. The method of claim 11, wherein controlling the sensing of the target neural signal comprises controlling the sensing of a neural signal including evoked compound action potentials (ECAPs), and determining the one or more suitable recording configurations comprises determining the one or more suitable recording configurations for automatic detection of one or more specified morphological features of the ECAPs.

14. The method of claim 11, further comprising determining the sequence of test recording configurations prior to the evaluation of the sequence of test recording configurations, including determining an order of the test recording configurations in the sequence of test recording configurations and determining timing windows for analyzing the processed target neural signal relative to the delivery of the neurostimulation.

15. The method of claim 14, wherein evaluating the sequence of test recording configurations comprises:
collecting data representing the processed target neural signal;
dividing the collected data into snippets using a window corresponding to a stimulation epoch associated with each stimulus of the neurostimulation and excluding artifact resulting from that stimulus; and
determining one or more specified morphological features of the target neural responses using the collected data in the snippets.

16. The method of claim 15, further comprising dynamically adjusting the sequence of test recording configurations during the evaluation of the sequence of test recording configurations while the neurostimulation is being delivered according to the sequence of test recording configurations based on results that have become available during the evaluation of the sequence of test recording configurations.

17. The method of claim 16, wherein dynamically adjusting the sequence of test recording configurations comprises adding test recording configurations defining one or more additional stimulation sites in response to the target neural responses not being detectable as indicated by the results that have become available during the evaluation of the sequence of test recording configurations.

18. The method of claim 11, wherein determining the one or more suitable recording configurations using the outcome of the evaluation comprises:
presenting the outcome of the evaluation using a user interface; and
receiving a selection of the one or more suitable recording configurations using the user interface.

19. The method of claim 18, further comprising:
detecting morphological features from the processed target neural signal; and
measuring one or more neural response parameters from the detected morphological features,
wherein presenting the outcome of the evaluation comprises presenting at least one of the detected morphological features or the measured one or more neural response parameters.

20. A non-transitory computer-readable storage medium including instructions, which when executed by a system, cause the system to perform a method for delivering neurostimulation to a patient and sensing one or more signals from the patient using a stimulation device and a plurality of electrodes coupled to the stimulation device, the method comprising:
controlling the delivery of the neurostimulation according to stimulation parameters;
controlling the sensing of a target neural signal of the one or more signals according to sensing parameters, the target neural signal including target neural responses each being a response of a specified type to the delivery of the neurostimulation; and
determining the stimulation parameters and the sensing parameters using a processor, including:
evaluating a sequence of test recording configurations each including a set of recording configuration parameters selected from the stimulation parameters and the sensing parameters, the set of recording configuration parameters including sensing parameters specifying a set of sensing electrodes selected from the plurality of electrodes and controlling processing of the sensed target neural signal; and
determining one or more suitable recording configurations using an outcome of the evaluation, the one or more suitable recording configurations each having values of the set of recording configuration parameters allowing for detection of the target neural responses from the processed target neural signal.

* * * * *